(12) United States Patent
Badaskar

(10) Patent No.: US 9,547,647 B2
(45) Date of Patent: Jan. 17, 2017

(54) VOICE-BASED MEDIA SEARCHING

(71) Applicant: Apple Inc., Cupertino, CA (US)

(72) Inventor: Sameer Badaskar, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 494 days.

(21) Appl. No.: 13/681,359

(22) Filed: Nov. 19, 2012

(65) Prior Publication Data

US 2014/0081633 A1 Mar. 20, 2014

Related U.S. Application Data

(60) Provisional application No. 61/703,176, filed on Sep. 19, 2012.

(51) Int. Cl.
*G06F 17/30* (2006.01)
*G10L 15/26* (2006.01)

(52) U.S. Cl.
CPC ... *G06F 17/30023* (2013.01); *G06F 17/30265* (2013.01); *G10L 15/26* (2013.01)

(58) Field of Classification Search
CPC ...... G10L 15/26; G10L 15/22; G10L 15/1815; G10L 15/183; G10L 15/19; G06F 17/278; G06F 17/2785; G06F 17/30241; G06F 17/30244; G06F 17/30864; G06F 3/0481
USPC . 704/235, 270, 275; 715/759, 703; 707/769; 348/270.1
See application file for complete search history.

(56) References Cited

U.S. PATENT DOCUMENTS

| | | | |
|---|---|---|---|
| 3,704,345 A | 11/1972 | Coker et al. | |
| 3,828,132 A | 8/1974 | Flanagan et al. | |
| 3,979,557 A | 9/1976 | Schulman et al. | |
| 4,278,838 A | 7/1981 | Antonov | |
| 4,282,405 A | 8/1981 | Taguchi | |
| 4,310,721 A | 1/1982 | Manley et al. | |
| 4,348,553 A | 9/1982 | Baker et al. | |
| 4,653,021 A | 3/1987 | Takagi | |

(Continued)

FOREIGN PATENT DOCUMENTS

| | | |
|---|---|---|
| CH | 681573 A5 | 4/1993 |
| CN | 1378156 A | 11/2002 |

(Continued)

OTHER PUBLICATIONS

Agnäs, MS., et al., "Spoken Language Translator: First-Year Report," Jan. 1994, SICS (ISSN 0283-3638), SRI and Telia Research AB, 161 pages.

(Continued)

*Primary Examiner* — Michael Colucci
(74) *Attorney, Agent, or Firm* — Morrison & Foerster LLP

(57) ABSTRACT

Methods and systems for searching for media items using a voice-based digital assistant are described. Natural language text strings corresponding to search queries are provided. The search queries include query terms. The text strings may correspond to speech inputs input by a user into an electronic device. At least one information source is searched to identify at least one parameter associated with at least one of the query terms. The parameters include at least one of a time parameter, a date parameter, or a geo-code parameter. The parameters are compared to tags of media items to identify matches. In some implementations, media items whose tags match the parameter are presented to the user.

28 Claims, 8 Drawing Sheets

(56) References Cited

U.S. PATENT DOCUMENTS

| | | |
|---|---|---|
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lenning et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |

(56) References Cited

U.S. PATENT DOCUMENTS

| | | | |
|---|---|---|---|
| 5,835,893 A | 11/1998 | Ushioda | |
| 5,839,106 A | 11/1998 | Bellegarda | |
| 5,845,255 A | 12/1998 | Mayaud | |
| 5,857,184 A | 1/1999 | Lynch | |
| 5,860,063 A | 1/1999 | Gorin et al. | |
| 5,862,223 A | 1/1999 | Walker et al. | |
| 5,864,806 A | 1/1999 | Mokbel et al. | |
| 5,864,844 A | 1/1999 | James et al. | |
| 5,867,799 A | 2/1999 | Lang et al. | |
| 5,873,056 A | 2/1999 | Liddy et al. | |
| 5,875,437 A | 2/1999 | Atkins | |
| 5,884,323 A | 3/1999 | Hawkins et al. | |
| 5,895,464 A | 4/1999 | Bhandari et al. | |
| 5,895,466 A | 4/1999 | Goldberg et al. | |
| 5,899,972 A | 5/1999 | Miyazawa et al. | |
| 5,913,193 A | 6/1999 | Huang et al. | |
| 5,915,249 A | 6/1999 | Spencer | |
| 5,930,769 A | 7/1999 | Rose | |
| 5,933,822 A | 8/1999 | Braden-Harder et al. | |
| 5,936,926 A | 8/1999 | Yokouchi et al. | |
| 5,940,811 A | 8/1999 | Norris | |
| 5,941,944 A | 8/1999 | Messerly | |
| 5,943,670 A | 8/1999 | Prager | |
| 5,948,040 A | 9/1999 | DeLorme et al. | |
| 5,956,699 A | 9/1999 | Wong et al. | |
| 5,960,422 A | 9/1999 | Prasad | |
| 5,963,924 A | 10/1999 | Williams et al. | |
| 5,966,126 A | 10/1999 | Szabo | |
| 5,970,474 A | 10/1999 | LeRoy et al. | |
| 5,974,146 A | 10/1999 | Randle et al. | |
| 5,982,891 A | 11/1999 | Ginter et al. | |
| 5,987,132 A | 11/1999 | Rowney | |
| 5,987,140 A | 11/1999 | Rowney et al. | |
| 5,987,404 A | 11/1999 | Della Pietra et al. | |
| 5,987,440 A | 11/1999 | O'Neil et al. | |
| 5,999,908 A | 12/1999 | Abelow | |
| 6,016,471 A | 1/2000 | Kuhn et al. | |
| 6,023,684 A | 2/2000 | Pearson | |
| 6,024,288 A | 2/2000 | Gottlich et al. | |
| 6,026,345 A | 2/2000 | Shah et al. | |
| 6,026,375 A | 2/2000 | Hall et al. | |
| 6,026,388 A | 2/2000 | Liddy et al. | |
| 6,026,393 A | 2/2000 | Gupta et al. | |
| 6,029,132 A | 2/2000 | Kuhn et al. | |
| 6,038,533 A | 3/2000 | Buchsbaum et al. | |
| 6,052,656 A | 4/2000 | Suda et al. | |
| 6,055,514 A | 4/2000 | Wren | |
| 6,055,531 A | 4/2000 | Bennett et al. | |
| 6,064,960 A | 5/2000 | Bellegarda et al. | |
| 6,070,139 A | 5/2000 | Miyazawa et al. | |
| 6,070,147 A | 5/2000 | Harms et al. | |
| 6,076,051 A | 6/2000 | Messerly et al. | |
| 6,076,088 A | 6/2000 | Paik et al. | |
| 6,078,914 A | 6/2000 | Redfern | |
| 6,081,750 A | 6/2000 | Hoffberg et al. | |
| 6,081,774 A | 6/2000 | de Hita et al. | |
| 6,088,731 A | 7/2000 | Kiraly et al. | |
| 6,094,649 A | 7/2000 | Bowen et al. | |
| 6,105,865 A | 8/2000 | Hardesty | |
| 6,108,627 A | 8/2000 | Sabourin | |
| 6,108,640 A * | 8/2000 | Slotznick | G06F 17/21 704/9 |
| 6,111,572 A * | 8/2000 | Blair | G06F 9/4448 704/8 |
| 6,119,101 A | 9/2000 | Peckover | |
| 6,122,616 A | 9/2000 | Henton | |
| 6,125,356 A | 9/2000 | Brockman et al. | |
| 6,144,938 A | 11/2000 | Surace et al. | |
| 6,173,261 B1 | 1/2001 | Arai et al. | |
| 6,173,279 B1 | 1/2001 | Levin et al. | |
| 6,188,999 B1 | 2/2001 | Moody | |
| 6,195,641 B1 | 2/2001 | Loring et al. | |
| 6,205,456 B1 | 3/2001 | Nakao | |
| 6,208,971 B1 | 3/2001 | Bellegarda et al. | |
| 6,233,559 B1 | 5/2001 | Balakrishnan | |
| 6,233,578 B1 | 5/2001 | Machihara et al. | |
| 6,246,981 B1 | 6/2001 | Papineni et al. | |
| 6,260,024 B1 | 7/2001 | Shkedy | |
| 6,266,637 B1 | 7/2001 | Donovan et al. | |
| 6,275,824 B1 | 8/2001 | O'Flaherty et al. | |
| 6,285,786 B1 | 9/2001 | Seni et al. | |
| 6,308,149 B1 | 10/2001 | Gaussier et al. | |
| 6,311,189 B1 | 10/2001 | deVries et al. | |
| 6,317,594 B1 | 11/2001 | Gossman et al. | |
| 6,317,707 B1 | 11/2001 | Bangalore et al. | |
| 6,317,831 B1 | 11/2001 | King | |
| 6,321,092 B1 | 11/2001 | Fitch et al. | |
| 6,334,103 B1 | 12/2001 | Surace et al. | |
| 6,356,854 B1 | 3/2002 | Schubert et al. | |
| 6,356,905 B1 | 3/2002 | Gershman et al. | |
| 6,366,883 B1 | 4/2002 | Campbell et al. | |
| 6,366,884 B1 | 4/2002 | Bellegarda et al. | |
| 6,421,672 B1 | 7/2002 | McAllister et al. | |
| 6,430,531 B1 * | 8/2002 | Polish | G10L 15/22 704/257 |
| 6,434,524 B1 | 8/2002 | Weber | |
| 6,446,076 B1 | 9/2002 | Burkey et al. | |
| 6,449,620 B1 | 9/2002 | Draper et al. | |
| 6,453,292 B2 | 9/2002 | Ramaswamy et al. | |
| 6,460,029 B1 | 10/2002 | Fries et al. | |
| 6,466,654 B1 | 10/2002 | Cooper et al. | |
| 6,477,488 B1 | 11/2002 | Bellegarda | |
| 6,487,534 B1 | 11/2002 | Thelen et al. | |
| 6,499,013 B1 | 12/2002 | Weber | |
| 6,501,937 B1 | 12/2002 | Ho et al. | |
| 6,505,158 B1 | 1/2003 | Conkie | |
| 6,505,175 B1 | 1/2003 | Silverman et al. | |
| 6,505,183 B1 | 1/2003 | Loofbourrow et al. | |
| 6,510,417 B1 | 1/2003 | Woods et al. | |
| 6,513,063 B1 | 1/2003 | Julia et al. | |
| 6,523,061 B1 | 2/2003 | Halverson et al. | |
| 6,523,172 B1 | 2/2003 | Martinez-Guerra et al. | |
| 6,526,382 B1 | 2/2003 | Yuschik | |
| 6,526,395 B1 | 2/2003 | Morris | |
| 6,532,444 B1 | 3/2003 | Weber | |
| 6,532,446 B1 | 3/2003 | King | |
| 6,546,388 B1 | 4/2003 | Edlund et al. | |
| 6,553,344 B2 | 4/2003 | Bellegarda et al. | |
| 6,556,983 B1 | 4/2003 | Altschuler et al. | |
| 6,584,464 B1 | 6/2003 | Warthen | |
| 6,598,039 B1 | 7/2003 | Livowsky | |
| 6,601,026 B2 | 7/2003 | Appelt et al. | |
| 6,601,234 B1 | 7/2003 | Bowman-Amuah | |
| 6,604,059 B2 | 8/2003 | Strubbe et al. | |
| 6,615,172 B1 | 9/2003 | Bennett et al. | |
| 6,615,175 B1 | 9/2003 | Gazdzinski | |
| 6,615,220 B1 | 9/2003 | Austin et al. | |
| 6,625,583 B1 | 9/2003 | Silverman et al. | |
| 6,631,346 B1 | 10/2003 | Karaorman et al. | |
| 6,633,846 B1 | 10/2003 | Bennett et al. | |
| 6,647,260 B2 | 11/2003 | Dusse et al. | |
| 6,650,735 B2 | 11/2003 | Burton et al. | |
| 6,654,740 B2 | 11/2003 | Tokuda et al. | |
| 6,665,639 B2 | 12/2003 | Mozer et al. | |
| 6,665,640 B1 | 12/2003 | Bennett et al. | |
| 6,665,641 B1 | 12/2003 | Coorman et al. | |
| 6,684,187 B1 | 1/2004 | Conkie | |
| 6,691,064 B2 | 2/2004 | Vroman | |
| 6,691,111 B2 | 2/2004 | Lazaridis et al. | |
| 6,691,151 B1 | 2/2004 | Cheyer et al. | |
| 6,697,780 B1 | 2/2004 | Beutnagel et al. | |
| 6,697,824 B1 | 2/2004 | Bowman-Amuah | |
| 6,701,294 B1 | 3/2004 | Ball et al. | |
| 6,711,585 B1 | 3/2004 | Copperman et al. | |
| 6,718,324 B2 | 4/2004 | Edlund et al. | |
| 6,721,728 B2 | 4/2004 | McGreevy | |
| 6,735,632 B1 | 5/2004 | Kiraly et al. | |
| 6,742,021 B1 | 5/2004 | Halverson et al. | |
| 6,757,362 B1 | 6/2004 | Cooper et al. | |
| 6,757,718 B1 | 6/2004 | Halverson et al. | |
| 6,766,320 B1 | 7/2004 | Want et al. | |
| 6,778,951 B1 | 8/2004 | Contractor | |
| 6,778,952 B2 | 8/2004 | Bellegarda | |
| 6,778,962 B1 | 8/2004 | Kasai et al. | |

(56) References Cited

U.S. PATENT DOCUMENTS

| | | | |
|---|---|---|---|
| 6,778,970 B2 | 8/2004 | Au | |
| 6,792,082 B1 | 9/2004 | Levine | |
| 6,807,574 B1 | 10/2004 | Partovi et al. | |
| 6,810,379 B1 | 10/2004 | Vermeulen et al. | |
| 6,813,491 B1 | 11/2004 | McKinney | |
| 6,829,603 B1 | 12/2004 | Chai et al. | |
| 6,832,194 B1 | 12/2004 | Mozer et al. | |
| 6,839,669 B1 * | 1/2005 | Gould | G10L 15/22 704/246 |
| 6,842,767 B1 | 1/2005 | Partovi et al. | |
| 6,847,966 B1 | 1/2005 | Sommer et al. | |
| 6,847,979 B2 | 1/2005 | Allemang et al. | |
| 6,851,115 B1 | 2/2005 | Cheyer et al. | |
| 6,859,931 B1 | 2/2005 | Cheyer et al. | |
| 6,895,380 B2 | 5/2005 | Sepe, Jr. | |
| 6,895,558 B1 | 5/2005 | Loveland | |
| 6,901,399 B1 | 5/2005 | Corston et al. | |
| 6,912,499 B1 | 6/2005 | Sabourin et al. | |
| 6,924,828 B1 | 8/2005 | Hirsch | |
| 6,928,614 B1 | 8/2005 | Everhart | |
| 6,931,384 B1 | 8/2005 | Horvitz et al. | |
| 6,937,975 B1 | 8/2005 | Elworthy | |
| 6,937,986 B2 | 8/2005 | Denenberg et al. | |
| 6,964,023 B2 | 11/2005 | Maes et al. | |
| 6,980,949 B2 | 12/2005 | Ford | |
| 6,980,955 B2 | 12/2005 | Okutani et al. | |
| 6,985,865 B1 | 1/2006 | Packingham et al. | |
| 6,988,071 B1 | 1/2006 | Gazdzinski | |
| 6,996,531 B2 | 2/2006 | Korall et al. | |
| 6,999,927 B2 | 2/2006 | Mozer et al. | |
| 7,020,685 B1 | 3/2006 | Chen et al. | |
| 7,027,974 B1 | 4/2006 | Busch et al. | |
| 7,036,128 B1 | 4/2006 | Julia et al. | |
| 7,050,977 B1 | 5/2006 | Bennett | |
| 7,058,569 B2 | 6/2006 | Coorman et al. | |
| 7,062,428 B2 | 6/2006 | Hogenhout et al. | |
| 7,069,560 B1 | 6/2006 | Cheyer et al. | |
| 7,092,887 B2 | 8/2006 | Mozer et al. | |
| 7,092,928 B1 | 8/2006 | Elad et al. | |
| 7,093,693 B1 | 8/2006 | Gazdzinski | |
| 7,127,046 B1 | 10/2006 | Smith et al. | |
| 7,127,403 B1 | 10/2006 | Saylor et al. | |
| 7,136,710 B1 | 11/2006 | Hoffberg et al. | |
| 7,137,126 B1 | 11/2006 | Coffman et al. | |
| 7,139,714 B2 | 11/2006 | Bennett et al. | |
| 7,139,722 B2 | 11/2006 | Perrella et al. | |
| 7,152,070 B1 | 12/2006 | Musick et al. | |
| 7,177,798 B2 | 2/2007 | Hsu et al. | |
| 7,197,460 B1 | 3/2007 | Gupta et al. | |
| 7,200,559 B2 | 4/2007 | Wang | |
| 7,203,646 B2 | 4/2007 | Bennett | |
| 7,216,073 B2 | 5/2007 | Lavi et al. | |
| 7,216,080 B2 | 5/2007 | Tsiao et al. | |
| 7,225,125 B2 | 5/2007 | Bennett et al. | |
| 7,233,790 B2 | 6/2007 | Kjellberg et al. | |
| 7,233,904 B2 | 6/2007 | Luisi | |
| 7,266,496 B2 | 9/2007 | Wang et al. | |
| 7,277,854 B2 | 10/2007 | Bennett et al. | |
| 7,290,039 B1 | 10/2007 | Lisitsa et al. | |
| 7,299,033 B2 | 11/2007 | Kjellberg et al. | |
| 7,310,600 B1 | 12/2007 | Garner et al. | |
| 7,324,947 B2 | 1/2008 | Jordan et al. | |
| 7,349,953 B2 | 3/2008 | Lisitsa et al. | |
| 7,376,556 B2 | 5/2008 | Bennett | |
| 7,376,645 B2 | 5/2008 | Bernard | |
| 7,379,874 B2 | 5/2008 | Schmid et al. | |
| 7,386,449 B2 | 6/2008 | Sun et al. | |
| 7,389,224 B1 | 6/2008 | Elworthy | |
| 7,392,185 B2 | 6/2008 | Bennett | |
| 7,398,209 B2 | 7/2008 | Kennewick et al. | |
| 7,403,938 B2 | 7/2008 | Harrison et al. | |
| 7,409,337 B1 | 8/2008 | Potter et al. | |
| 7,415,100 B2 | 8/2008 | Cooper et al. | |
| 7,418,392 B1 | 8/2008 | Mozer et al. | |
| 7,426,467 B2 | 9/2008 | Nashida et al. | |
| 7,427,024 B1 | 9/2008 | Gazdzinski et al. | |
| 7,447,635 B1 | 11/2008 | Konopka et al. | |
| 7,454,351 B2 | 11/2008 | Jeschke et al. | |
| 7,467,087 B1 | 12/2008 | Gillick et al. | |
| 7,475,010 B2 | 1/2009 | Chao | |
| 7,483,894 B2 | 1/2009 | Cao | |
| 7,487,089 B2 | 2/2009 | Mozer | |
| 7,496,498 B2 | 2/2009 | Chu et al. | |
| 7,496,512 B2 | 2/2009 | Zhao et al. | |
| 7,502,738 B2 | 3/2009 | Kennewick et al. | |
| 7,508,373 B2 | 3/2009 | Lin et al. | |
| 7,522,927 B2 | 4/2009 | Fitch et al. | |
| 7,523,108 B2 | 4/2009 | Cao | |
| 7,526,466 B2 | 4/2009 | Au | |
| 7,529,671 B2 | 5/2009 | Rockenbeck et al. | |
| 7,529,676 B2 | 5/2009 | Koyama | |
| 7,539,656 B2 | 5/2009 | Fratkina et al. | |
| 7,546,382 B2 | 6/2009 | Healey et al. | |
| 7,548,895 B2 | 6/2009 | Pulsipher | |
| 7,552,055 B2 | 6/2009 | Lecoeuche | |
| 7,555,431 B2 | 6/2009 | Bennett | |
| 7,558,730 B2 | 7/2009 | Davis et al. | |
| 7,571,106 B2 | 8/2009 | Cao et al. | |
| 7,599,918 B2 | 10/2009 | Shen et al. | |
| 7,620,549 B2 | 11/2009 | Di Cristo et al. | |
| 7,624,007 B2 | 11/2009 | Bennett | |
| 7,634,409 B2 | 12/2009 | Kennewick et al. | |
| 7,636,657 B2 | 12/2009 | Ju et al. | |
| 7,640,160 B2 | 12/2009 | Di Cristo et al. | |
| 7,647,225 B2 | 1/2010 | Bennett et al. | |
| 7,657,424 B2 | 2/2010 | Bennett | |
| 7,672,841 B2 | 3/2010 | Bennett | |
| 7,676,026 B1 | 3/2010 | Baxter, Jr. | |
| 7,684,985 B2 | 3/2010 | Dominach et al. | |
| 7,693,715 B2 | 4/2010 | Hwang et al. | |
| 7,693,720 B2 | 4/2010 | Kennewick et al. | |
| 7,698,131 B2 | 4/2010 | Bennett | |
| 7,702,500 B2 | 4/2010 | Blaedow | |
| 7,702,508 B2 | 4/2010 | Bennett | |
| 7,707,027 B2 | 4/2010 | Balchandran et al. | |
| 7,707,032 B2 | 4/2010 | Wang et al. | |
| 7,707,267 B2 | 4/2010 | Lisitsa et al. | |
| 7,711,565 B1 | 5/2010 | Gazdzinski | |
| 7,711,672 B2 | 5/2010 | Au | |
| 7,716,056 B2 | 5/2010 | Weng et al. | |
| 7,720,674 B2 | 5/2010 | Kaiser et al. | |
| 7,720,683 B1 | 5/2010 | Vermeulen et al. | |
| 7,725,307 B2 | 5/2010 | Bennett | |
| 7,725,318 B2 | 5/2010 | Gavalda et al. | |
| 7,725,320 B2 | 5/2010 | Bennett | |
| 7,725,321 B2 | 5/2010 | Bennett | |
| 7,729,904 B2 | 6/2010 | Bennett | |
| 7,729,916 B2 | 6/2010 | Coffman et al. | |
| 7,734,461 B2 | 6/2010 | Kwak et al. | |
| 7,747,616 B2 | 6/2010 | Yamada et al. | |
| 7,752,152 B2 | 7/2010 | Paek et al. | |
| 7,756,868 B2 | 7/2010 | Lee | |
| 7,774,204 B2 | 8/2010 | Mozer et al. | |
| 7,783,486 B2 | 8/2010 | Rosser et al. | |
| 7,801,729 B2 | 9/2010 | Mozer | |
| 7,809,570 B2 | 10/2010 | Kennewick et al. | |
| 7,809,610 B2 | 10/2010 | Cao | |
| 7,818,176 B2 | 10/2010 | Freeman et al. | |
| 7,822,608 B2 | 10/2010 | Cross, Jr. et al. | |
| 7,826,945 B2 | 11/2010 | Zhang et al. | |
| 7,831,426 B2 | 11/2010 | Bennett | |
| 7,840,400 B2 | 11/2010 | Lavi et al. | |
| 7,840,447 B2 | 11/2010 | Kleinrock et al. | |
| 7,853,574 B2 | 12/2010 | Kraenzel et al. | |
| 7,873,519 B2 | 1/2011 | Bennett | |
| 7,873,654 B2 | 1/2011 | Bernard | |
| 7,881,936 B2 | 2/2011 | Longé et al. | |
| 7,890,652 B2 | 2/2011 | Bull et al. | |
| 7,912,702 B2 | 3/2011 | Bennett | |
| 7,917,367 B2 | 3/2011 | Di Cristo et al. | |
| 7,917,497 B2 | 3/2011 | Harrison et al. | |
| 7,920,678 B2 | 4/2011 | Cooper et al. | |
| 7,925,525 B2 | 4/2011 | Chin | |
| 7,930,168 B2 | 4/2011 | Weng et al. | |

(56) References Cited

U.S. PATENT DOCUMENTS

| | | |
|---|---|---|
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,209,183 B1* | 6/2012 | Patel ............... G06K 9/72 382/181 |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,352,183 B2* | 1/2013 | Thota ............... G06Q 10/107 340/995.14 |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 8,606,568 B1* | 12/2013 | Tickner ............... G10L 15/1815 704/231 |
| 8,655,901 B1* | 2/2014 | Li ............... G06F 17/30864 704/7 |
| 2001/0047264 A1 | 11/2001 | Roundtree |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0164000 A1 | 11/2002 | Cohen et al. |
| 2002/0198714 A1 | 12/2002 | Zhou |
| 2003/0069893 A1 | 4/2003 | Kanai et al. |
| 2003/0216919 A1* | 11/2003 | Roushar ............... G06F 17/277 704/260 |
| 2004/0135701 A1 | 7/2004 | Yasuda et al. |
| 2004/0236778 A1 | 11/2004 | Junqua et al. |
| 2005/0055403 A1 | 3/2005 | Brittan |
| 2005/0071332 A1 | 3/2005 | Ortega et al. |
| 2005/0075881 A1* | 4/2005 | Rigazio ............... G10L 15/26 704/270 |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0196733 A1 | 9/2005 | Budra et al. |
| 2005/0254481 A1* | 11/2005 | Vishik ............... H04L 12/58 370/352 |
| 2005/0288936 A1 | 12/2005 | Busayapongchai et al. |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0287864 A1* | 12/2006 | Pusa ............... G10L 15/26 704/275 |
| 2007/0055529 A1 | 3/2007 | Kanevsky et al. |
| 2007/0058832 A1 | 3/2007 | Hug et al. |
| 2007/0061712 A1* | 3/2007 | Bodin ............... G06Q 10/109 715/234 |
| 2007/0088556 A1* | 4/2007 | Andrew ............... G10L 15/19 704/270.1 |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174057 A1* | 7/2007 | Genly ............... H04N 5/4403 704/270 |
| 2007/0174188 A1 | 7/2007 | Fish |
| 2007/0185917 A1 | 8/2007 | Prahlad et al. |
| 2007/0258642 A1* | 11/2007 | Thota ............... G06F 17/30241 382/173 |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0120112 A1 | 5/2008 | Jordan et al. |
| 2008/0129520 A1 | 6/2008 | Lee |
| 2008/0140657 A1 | 6/2008 | Azvine et al. |
| 2008/0208864 A1* | 8/2008 | Cucerzan ............... G06F 17/278 |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0076821 A1* | 3/2009 | Brenner ............... G06F 17/30053 704/260 |
| 2009/0077165 A1 | 3/2009 | Rhodes et al. |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |

(56) References Cited

U.S. PATENT DOCUMENTS

| | | |
|---|---|---|
| 2010/0042400 A1 | 2/2010 | Block et al. |
| 2010/0046842 A1* | 2/2010 | Conwell ............ G06F 17/30265 382/218 |
| 2010/0071003 A1* | 3/2010 | Bychkov ................ G06Q 30/02 725/46 |
| 2010/0088020 A1 | 4/2010 | Sano et al. |
| 2010/0114856 A1 | 5/2010 | Kuboyama |
| 2010/0138215 A1 | 6/2010 | Williams |
| 2010/0145700 A1 | 6/2010 | Kennewick et al. |
| 2010/0180218 A1* | 7/2010 | Boston ................ G06F 3/0481 715/759 |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0022394 A1* | 1/2011 | Wide ................ G06K 9/00718 704/270 |
| 2011/0047072 A1 | 2/2011 | Ciurea |
| 2011/0055256 A1* | 3/2011 | Phillips ................ G10L 15/30 707/769 |
| 2011/0060807 A1 | 3/2011 | Martin et al. |
| 2011/0066468 A1* | 3/2011 | Huang ................ G01C 21/3438 705/7.19 |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0039539 A1* | 2/2012 | Boiman ................ G11B 27/28 382/195 |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0239661 A1* | 9/2012 | Giblin ................ G06F 17/30817 707/741 |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2012/0316878 A1* | 12/2012 | Singleton ................ G10L 15/08 704/251 |
| 2013/0110518 A1 | 5/2013 | Gruber et al. |
| 2013/0110520 A1 | 5/2013 | Cheyer et al. |
| 2013/0289991 A1* | 10/2013 | Eshwar ............ G06F 17/30902 704/246 |
| 2013/0307997 A1* | 11/2013 | O'Keefe ................ H04L 51/10 348/207.1 |
| 2013/0346068 A1 | 12/2013 | Solem et al. |

FOREIGN PATENT DOCUMENTS

| | | |
|---|---|---|
| DE | 3837590 A1 | 5/1990 |
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2001-282813 A | 10/2001 |
| JP | 2002 024212 | 1/2002 |
| JP | 2003 517158 A | 5/2003 |
| JP | 2009 036999 | 2/2009 |
| JP | 2010-108378 A | 5/2010 |
| KR | 10-2001-0093654 A | 10/2001 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Allen, J., "Natural Language Understanding," 2nd Edition, Copyright © 1995 by The Benjamin/Cummings Publishing Company, Inc., 671 pages.

Alshawi, H., et al., "CLARE: A Contextual Reasoning and Cooperative Response Framework for the Core Language Engine," Dec.

(56) References Cited

OTHER PUBLICATIONS

1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z 1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Bulyko, I. et al., "Error-Correction Detection and Response Generation in a Spoken Dialogue System," © 2004 Elsevier B.V., specom.2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 Pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.
Exhibit 1, "Natural Language Interface Using Constrained Intermediate Dictionary of Results," List of Publications Manually reviewed for the Search of U.S. Pat. No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.

(56) References Cited

OTHER PUBLICATIONS

Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems—Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages. Best Copy Available.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.

Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of EUROSPEECH, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Kats, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.
Laird, J., et al., "SOAR: An Architecture for General Intelligence," 1987, Artificial Intelligence vol. 33, 64 pages.
Langly, P., et al.,"A Design for the Icarus Architechture," SIGART Bulletin, vol. 2, No. 4, 6 pages.
Larks, "Intelligent Software Agents: Larks," 2006, downloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.
Martin, P., et al., "Transportability and Generality in a Natural-Language Interface System," Aug. 8-12, 1983, Proceedings of the Eight International Joint Conference on Artificial Intelligence, West Germany, 21 pages.
Matiasek, J., et al., "Tamic-P: A System for NL Access to Social Insurance Database," Jun. 17-19, 1999, Proceeding of the 4th

(56) References Cited

OTHER PUBLICATIONS

International Conference on Applications of Natural Language to Information Systems, Austria, 7 pages.
Michos, S.E., et al., "Towards an adaptive natural language interface to command languages," Natural Language Engineering 2 (3), © 1994 Cambridge University Press, 19 pages. Best Copy Available.
Milstead, J., et al., "Metadata: Cataloging by Any Other Name . . . " Jan. 1999, Online, Copyright © 1999 Information Today, Inc., 18 pages.
Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.
Moore, R., et al., "Combining Linguistic and Statistical Knowledge Sources in Natural-Language Processing for ATIS," 1995, SRI International, Artificial Intelligence Center, 4 pages.
Moore, R., "Handling Complex Queries in a Distributed Data Base," Oct. 8, 1979, SRI International, Artificial Intelligence Center, 38 pages.
Moore, R., "Practical Natural-Language Processing by Computer," Oct. 1981, SRI International, Artificial Intelligence Center, 34 pages.
Moore, R., et al., "SRI's Experience with the ATIS Evaluation," Jun. 24-27, 1990, Proceedings of a workshop held at Hidden Valley, Pennsylvania, 4 pages. Best Copy Available.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.
Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motro, A., "Flex: A Tolerant and Cooperative User Interface to Databases," IEEE Transactions on Knowledge and Data Engineering, vol. 2, No. 2, Jun. 1990, 16 pages.
Murveit, H., et al., "Speech Recognition in SRI's Resource Management and ATIS Systems," 1991, Proceedings of the workshop on Speech and Natural Language (HTL'91), 7 pages.
OAA, "The Open Agent Architecture 1.0 Distribution Source Code," Copyright 1999, SRI International, 2 pages.
Odubiyi, J., et al., "Saire—a scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.
Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., et al., "Adapting the Core Language Engine to French and Spanish," May 10, 1996, Cornell University Library, 9 pages. http://arxiv.org/abs/cmp-lg/9605015.
Rayner, M., "Abductive Equivalential Translation and its application to Natural Language Database Interfacing," Sep. 1993 Dissertation paper, SRI International, 163 pages.
Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993. html#RaynerBCCDGKKLPPS93.
Rudnicky, A.I., et al., "Creating Natural Dialogs in the Carnegie Mellon Communicator System".
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
SRI2009, "SRI Speech: Products: Software Development Kits: EduSpeak," 2009, 2 pages, available at http://web.archive.org/web/20090828084033/http://www.speechatsri.com/products/eduspeak.shtml.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.

(56) References Cited

OTHER PUBLICATIONS

Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkom: multimodal communication with a life-like character," 2001 EUROSPEECH—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages. Best Copy Available.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Bussler, C., et al., "Web Service Execution Environment (WSMX)," Jun. 3, 2005, W3C Member Submission, http://www.w3.org/Submission/WSMX, 29 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask for," Feb. 9, 2012, http://www.psfk.com/2012/02/multimedia-sid.html, 9 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
Elio, R. et al., "On Abstract Task Models and Conversation Policies," http://webdocs.cs.ualberta.ca/~ree/publications/papers2/ATS.AA99.pdf, May 1999, 10 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

(56) References Cited

OTHER PUBLICATIONS

Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.
Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.
Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.
Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.
Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.
Gruber, T. R., "Where the Social Web meets the Semantic Web," Presentation at the 5th International Semantic Web Conference, Nov. 7, 2006, 38 pages.
Gruber, T. R., "Despite our Best Efforts, Ontologies are not the Problem," AAAI Spring Symposium, Mar. 2008, http://tomgruber.org/writing/aaai-ss08.htm, 40 pages.
Gruber, T. R., "Enterprise Collaboration Management with Intraspect," Intraspect Software, Inc., Instraspect Technical White Paper Jul. 2001, 24 pages.
Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.
Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.
Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.
Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.
Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.
Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.
Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.
Gruber, T. R., et al.,"NIKE: A National Infrastructure for Knowledge Exchange," Oct. 1994, http://www.eit.com/papers/nike/nike.html and nike.ps, 10 pages.
Gruber, T. R., "Ontologies, Web 2.0 and Beyond," Apr. 24, 2007, Ontology Summit 2007, http://tomgruber.org/writing/ontolog-social-web-keynote.pdf, 17 pages.
Gruber, T. R., "Ontology of Folksonomy: A Mash-up of Apples and Oranges," Originally published to the web in 2005, Int'l Journal on Semantic Web & Information Systems, 3(2), 2007, 7 pages.
Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.
Gruber, T. R., "TagOntology," Presentation to Tag Camp, www.tagcamp.org, Oct. 29, 2005, 20 pages.
Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.
Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.
Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.
Guzzoni, D., et al., "Active, A Tool for Building Intelligent User Interfaces," ASC 2007, Palma de Mallorca, http://lsro.epfl.ch/page-34241.html, 6 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

(56) References Cited

OTHER PUBLICATIONS

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/sunnmary?doi=10.1.1.16.3022, 4 pages.
Milward, D., et al., "D2.2: Dynamic Multimodal Interface Reconfiguration, Talk and Look: Tools for Ambient Linguistic Knowledge," Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
*Phoenix Solutions, Inc.* v. *West Interactive Corp.*, Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ksl-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.
Roddy, D., et al., "Communication and Collaboration in a Landscape of B2B eMarketplaces," VerticalNet Solutions, white paper, Jun. 15, 2000, 23 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.

Stent, A., et al., "The CommandTalk Spoken Dialogue System," 1999, http://acl.ldc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20, 1 page.
YouTube,"Send Text, Listen to and Send E-Mail 'By Voice' www.voiceassist.com," 2:11 minute video uploaded to YouTube by VoiceAssist on Jul 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
International Search Report and Written Opinion dated Nov. 29, 2011, received in International Application No. PCT/US2011/20861, which corresponds to U.S. Appl. No. 12/987,982, 15 pages (Thomas Robert Gruber).
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of The Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.

(56) References Cited

OTHER PUBLICATIONS

Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges,15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.

(56) References Cited

OTHER PUBLICATIONS

Gray, R. M., "Vector Quantization," IEEE ASSP Magazine, Apr. 1984, 26 pages.

Harris, F. J., "On the Use of Windows for Harmonic Analysis with the Discrete Fourier Transform," In Proceedings of the IEEE, vol. 66, No. 1, Jan. 1978, 34 pages.

Helm, R., et al., "Building Visual Language Parsers," In Proceedings of CHI'91 Proceedings of the SIGCHI Conference on Human Factors in Computing Systems, 8 pages.

Hermansky, H., "Perceptual Linear Predictive (PLP) Analysis of Speech," Journal of the Acoustical Society of America, vol. 87, No. 4, Apr. 1990, 15 pages.

Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.

Hoehfeld M., et al., "Learning with Limited Numerical Precision Using the Cascade-Correlation Algorithm," IEEE Transactions on Neural Networks, vol. 3, No. 4, Jul. 1992, 18 pages.

Holmes, J. N., "Speech Synthesis and Recognition—Stochastic Models for Word Recognition," Speech Synthesis and Recognition, Published by Chapman & Hall, London, ISBN 0 412 534304, © 1998 J. N. Holmes, 7 pages.

Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.

IBM Technical Disclosure Bulletin, "Speech Editor," vol. 29, No. 10, Mar. 10, 1987, 3 pages.

IBM Technical Disclosure Bulletin, "Integrated Audio-Graphics User Interface," vol. 33, No. 11, Apr. 1991, 4 pages.

IBM Technical Disclosure Bulletin, "Speech Recognition with Hidden Markov Models of Speech Waveforms," vol. 34, No. 1, Jun. 1991, 10 pages.

Iowegian International, "FIR Filter Properties," dspGuro, Digital Signal Processing Central, http://www.dspguru.com/dsp/taqs/fir/properties, downloaded on Jul. 28, 2010, 6 pages.

Jacobs, P. S., et al., "Scisor: Extracting Information from On-Line News," Communications of the ACM, vol. 33, No. 11, Nov. 1990, 10 pages.

Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.

Jennings, A., et al., "A Personal News Service Based on a User Model Neural Network," IEICE Transactions on Information and Systems, vol. E75-D, No. 2, Mar. 1992, Tokyo, JP, 12 pages.

Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.

Jones, J., "Speech Recognition for Cyclone," Apple Computer, Inc., E.R.S., Revision 2.9, Sep. 10, 1992, 93 pages.

Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.

Kitano, H., "PhiDM-Dialog, An Experimental Speech-to-Speech Dialog Translation System," Jun. 1991 Computer, vol. 24, No. 6, 13 pages.

Klabbers, E., et al., "Reducing Audible Spectral Discontinuities," IEEE Transactions on Speech and Audio Processing, vol. 9, No. 1, Jan. 2001, 13 pages.

Klatt, D. H., "Linguistic Uses of Segmental Duration in English: Acoustic and Perpetual Evidence," Journal of the Acoustical Society of America, vol. 59, No. 5, May 1976, 16 pages.

Kominek, J., et al., "Impact of Durational Outlier Removal from Unit Selection Catalogs," 5th ISCA Speech Synthesis Workshop, Jun. 14-16, 2004, 6 pages.

Kubala, F., et al., "Speaker Adaptation from a Speaker-Independent Training Corpus," International Conference on Acoustics, Speech, and Signal Processing (ICASSP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.

Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based $N$-Gram Language Model," IEEE International Conference on Acoustics, Speech, and Signal Processing (ICASSP'96), vol. 1, May 7-10, 1996, 6 pages.

(56) References Cited

OTHER PUBLICATIONS

Papadimitriou, C. H., et al., "Latent Semantic Indexing: A Probabilistic Analysis," Nov. 14, 1997, http://citeseerx.ist.psu.edu/messages/downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.
Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 AT&T, Published by Prentice-Hall, Inc., ISBN: 0-13-285826-6, 17 pages.
Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration—Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture—2 course presentation, University of Maryland, College Park, 8 pages.
Wu, M., "Speech Recognition, Synthesis, and H.C.I.," ENEE408G Capstone—Multimedia Signal Processing, Spring 2003, Lecture—3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).

(56) References Cited

OTHER PUBLICATIONS

International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
International Search Report and Written Opinion received for PCT Patent Application No. PCT/US2013/060121, mailed on Dec. 6, 2013, 8 pages.
International Preliminary Report on Patentability received for PCT Patent Application No. PCT/US2013/060121, mailed on Apr. 2, 2015, 6 pages.
Martins et al., "Extracting and Exploring the Geo-Temporal Semantics of Textual Resources", Semantic Computing, IEEE International Conference, 2008, pp. 1-9.
Hashimoto, Yoshiyuki, "Simple Guide for iPhone Siri, which can be Operated with your Voice", Shuwa System Co. Ltd., vol. 1, Jul. 5, 2012, pp. 8, 130, 131 (English Translation only).

* cited by examiner

VOICE-BASED MEDIA SEARCHING

RELATED APPLICATION

This application claims priority to U.S. Provisional Application Ser. No. 61/703,176, filed Sep. 19, 2012, which is incorporated herein by reference in its entirety.

TECHNICAL FIELD

The disclosed implementations relate generally to digital assistant systems, and more specifically, to a method and system for voice-based media searching.

BACKGROUND

Advances in camera technology, image processing and image storage technology have enabled humans to seamlessly interact with and "capture" their surroundings through digital photography. Moreover, recent advances in technology surrounding hand-held devices (e.g., mobile phones and digital assistant systems) have improved image capture and image storage capabilities on hand-held devices. This has led to a substantial increase in the use of hand-held devices for photo acquisition and digital photo storage.

The growing volume of digital photographs acquired and stored on electronic devices has created a need for systematic cataloging and efficient organization of the photographs in order to enable ease of viewing and searching. Tagging of photographs, for example, by associating with the photograph names of people or places, facilitates the ease of organizing and searching for photographs. Other information, such as time, date, and GPS coordinate data, are also increasingly associated with photographs, allowing efficient sorting and organization.

While photo capture and digital image storage technology has improved substantially over the past decade, traditional approaches to photo searching can be non-intuitive, arduous, and time-consuming.

SUMMARY

Accordingly, there is a need for a simple, intuitive, user-friendly way to search for photographs. The present invention provides systems and methods for voice-based photo searching implemented at an electronic device.

Implementations described below provide a method and system of voice-based photo searching through the use of natural language processing techniques. Natural language processing techniques are deployed to enable users to interact in spoken or textual forms with hand-held devices and digital assistant systems, whereby digital assistant systems can interpret the user's input to deduce the user's intent, translate the deduced intent into actionable tasks and parameters, execute operations or deploy services to perform the tasks, and produce output that is intelligible to the user.

Voice-based photo searching dramatically increases the speed and convenience of photo searching. For example, by combining speech recognition techniques with intelligent natural-language processing, the disclosed implementations enable users simply to speak a description of the photographs that they want to search for, such as "show me my vacation photos," and the photos will be automatically identified and returned to the user for viewing, editing, and the like. The disclosed techniques are able to process this speech-based input in order to find and retrieve relevant photographs even where the photographs have not been previously associated with user-generated textual tags, such as "vacation" or "beach." Rather, metadata that is stored with digital photographs when they are captured or saved is cross-referenced with other user information to facilitate searching. For example, a calendar entry indicating that a user's vacation spans a certain set of days can be used to create a search query to find photographs taken or saved on those dates. As another example, a table associating geo-codes with locations may be consulted to determine a range of geo-codes that corresponds to a location identified in a search query. The user's photographs can then be searched to find those whose geo-codes correspond to the identified location.

Thus, the implementations disclosed herein provide methods, systems, and computer readable storage media that enable voice-based, natural-language photo searching.

Some implementations provide a method for searching for media items using a voice-based digital assistant. The method is performed at an electronic device with a processor and memory storing instructions for execution by the processor. The method includes providing multiple media items. Media items may include photographs, videos, and/or audio. At least some of the media items are each associated with a respective tag comprising at least one of a time tag, a date tag, or a geo-code tag. In some implementations, tags are stored with media items as metadata.

The method further includes providing a natural language text string corresponding to a search query for one or more media items, where the search query includes one or more query terms. In some implementations, the text string corresponds to a speech input from a user. In some implementations, the speech input is converted to text using speech-to-text processing.

The method further includes searching at least one information source to identify at least one parameter associated with at least one of the one or more query terms. In some implementations, the information source is a calendar, email/text messages, social network postings, a contact book, and/or the like. The at least one parameter comprises at least one of a time parameter, a date parameter, or a geo-code parameter. The at least one parameter is separate from the tags associated with the multiple media items, e.g., the parameter is not part of a media item's metadata.

The method further includes comparing the respective tags to the at least one parameter to identify at least one media item whose tag matches the identified parameter, and facilitating the presentation of the at least one media item to a user. In some implementations, facilitating the presentation includes displaying the at least one media item to the user.

In accordance with some embodiments, an electronic device including one or more processors, memory, and one or more programs stored in the memory and configured to be executed by the one or more processors include instructions for performing the operations of any of the methods described above. In accordance with some embodiments, a non-transitory computer readable storage medium has stored therein instructions which, when executed by an electronic device, cause the device to perform the operations of any of the methods described above

BRIEF DESCRIPTION OF THE DRAWINGS

Like reference numerals refer to corresponding parts throughout the drawings.

DESCRIPTION OF IMPLEMENTATIONS

Figure 1:
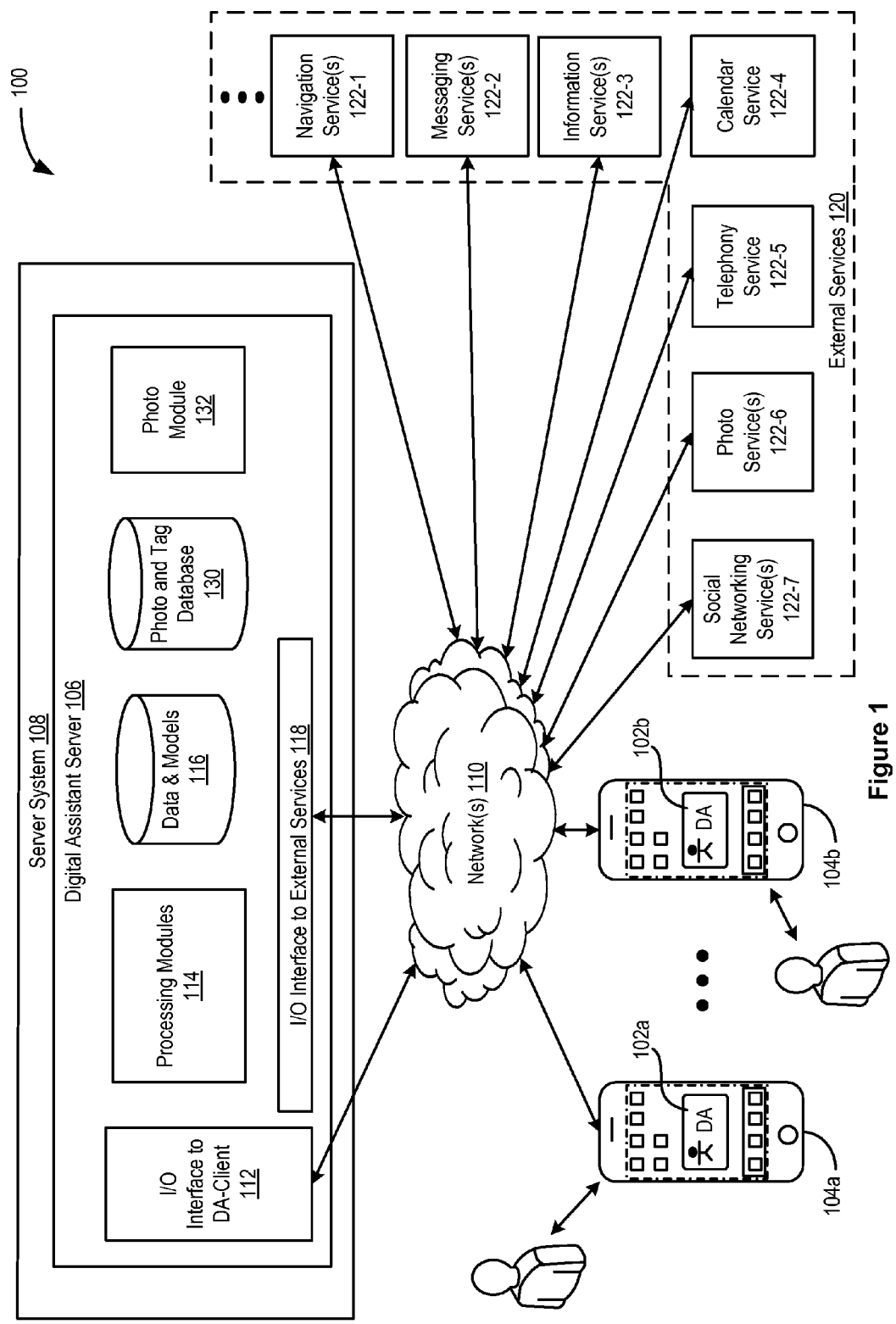
FIG. 1 is a block diagram illustrating an environment in which a digital assistant operates in accordance with some implementations.

FIG. 1 is a block diagram of an operating environment 100 of a digital assistant according to some implementations. The terms "digital assistant," "virtual assistant," "intelligent automated assistant," or "automatic digital assistant," refer to any information processing system that interprets natural language input in spoken and/or textual form to deduce user intent (e.g., identify a task type that corresponds to the natural language input), and performs actions based on the deduced user intent (e.g., perform a task corresponding to the identified task type). For example, to act on a deduced user intent, the system can perform one or more of the following: identifying a task flow with steps and parameters designed to accomplish the deduced user intent (e.g., identifying a task type), inputting specific requirements from the deduced user intent into the task flow, executing the task flow by invoking programs, methods, services, APIs, or the like (e.g., sending a request to a service provider); and generating output responses to the user in an audible (e.g., speech) and/or visual form.

Specifically, a digital assistant system is capable of accepting a user request at least partially in the form of a natural language command, request, statement, narrative, and/or inquiry. Typically, the user request seeks either an informational answer or performance of a task by the digital assistant system. A satisfactory response to the user request is generally either provision of the requested informational answer, performance of the requested task, or a combination of the two. For example, a user may ask the digital assistant system a question, such as "Where am I right now?" Based on the user's current location, the digital assistant may answer, "You are in Central Park near the west gate." The user may also request the performance of a task, for example, by stating "Please invite my friends to my girlfriend's birthday party next week." In response, the digital assistant may acknowledge the request by generating a voice output, "Yes, right away," and then send a suitable calendar invite from the user's email address to each of the user' friends listed in the user's electronic address book or contact list. There are numerous other ways of interacting with a digital assistant to request information or performance of various tasks. In addition to providing verbal responses and taking programmed actions, the digital assistant can also provide responses in other visual or audio forms (e.g., as text, alerts, music, videos, animations, etc.).

As shown in FIG. 1, in some implementations, a digital assistant system is implemented according to a client-server model. The digital assistant system includes a client-side portion (e.g., 102a and 102b) (hereafter "digital assistant (DA) client 102") executed on a user device (e.g., 104a and 104b), and a server-side portion 106 (hereafter "digital assistant (DA) server 106") executed on a server system 108.

The DA client 102 communicates with the DA server 106 through one or more networks 110. The DA client 102 provides client-side functionalities such as user-facing input and output processing and communications with the DA server 106. The DA server 106 provides server-side functionalities for any number of DA clients 102 each residing on a respective user device 104 (also called a client device).

In some implementations, the DA server 106 includes a client-facing I/O interface 112, one or more processing modules 114, data and models 116, an I/O interface to external services 118, a photo and tag database 130, and a photo-tag module 132. The client-facing I/O interface facilitates the client-facing input and output processing for the digital assistant server 106. The one or more processing modules 114 utilize the data and models 116 to determine the user's intent based on natural language input and perform task execution based on the deduced user intent. Photo and tag database 130 stores fingerprints of digital photographs, and, optionally digital photographs themselves, as well as metadata and user- and/or automatically-generated tags associated with the digital photographs. Photo-tag module 132 creates tags, stores tags in association with photographs and/or fingerprints, automatically tags photographs, and links tags to locations within photographs.

In some implementations, the DA server 106 communicates with external services 120 (e.g., navigation service(s) 122-1, messaging service(s) 122-2, information service(s) 122-3, calendar service 122-4, telephony service 122-5, photo service(s) 122-6, social networking service(s) 122-7, etc.) through the network(s) 110 for task completion or information acquisition. The I/O interface to the external services 118 facilitates such communications.

Examples of the user device 104 include, but are not limited to, a handheld computer, a personal digital assistant (PDA), a tablet computer, a laptop computer, a desktop computer, a cellular telephone, a smartphone, an enhanced general packet radio service (EGPRS) mobile phone, a media player, a navigation device, a game console, a television, a remote control, or a combination of any two or more of these data processing devices or any other suitable data processing devices. More details on the user device 104 are provided in reference to an exemplary user device 104 shown in FIG. 2.

Examples of the communication network(s) 110 include local area networks ("LAN") and wide area networks ("WAN"), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 can be implemented on at least one data processing apparatus and/or a distributed network of computers. In some implementations, the server system 108 also employs various virtual devices and/or services of third party service providers (e.g., third-party cloud service providers) to provide the underlying computing resources and/or infrastructure resources of the server system 108.

Although the digital assistant system shown in FIG. 1 includes both a client-side portion (e.g., the DA client 102) and a server-side portion (e.g., the DA server 106), in some implementations, a digital assistant system refers only to the server-side portion (e.g., the DA server 106). In some implementations, the functions of a digital assistant can be implemented as a standalone application installed on a user device. In addition, the divisions of functionalities between the client and server portions of the digital assistant can vary in different implementations. For example, in some implementations, the DA client 102 is a thin-client that provides only user-facing input and output processing functions, and delegates all other functionalities of the digital assistant to the DA server 106. In some other implementations, the DA client 102 is configured to perform or assist one or more functions of the DA server 106.

Figure 2:
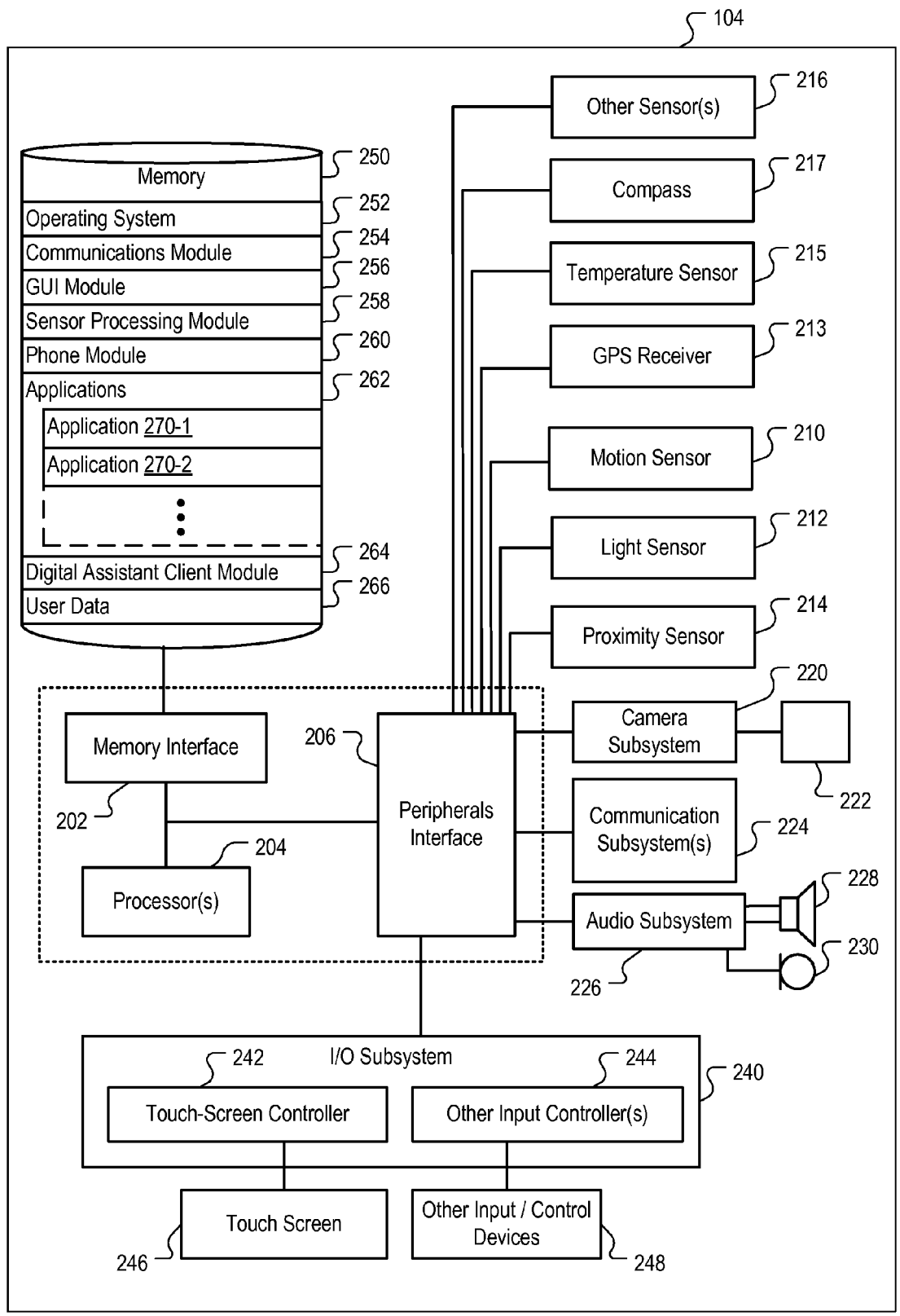
FIG. 2 is a block diagram illustrating a digital assistant client system in accordance with some implementations.

FIG. 2 is a block diagram of a user device 104 in accordance with some implementations. The user device 104 includes a memory interface 202, one or more processors 204, and a peripherals interface 206. The various components in the user device 104 are coupled by one or more communication buses or signal lines. The user device 104 includes various sensors, subsystems, and peripheral devices that are coupled to the peripherals interface 206. The sensors, subsystems, and peripheral devices gather information and/or facilitate various functionalities of the user device 104.

For example, in some implementations, a motion sensor 210 (e.g., an accelerometer), a light sensor 212, a GPS receiver 213, a temperature sensor 215, and compass 217, and a proximity sensor 214 are coupled to the peripherals interface 206 to facilitate orientation, light, and proximity sensing functions. In some implementations, other sensors 216, such as a biometric sensor, barometer, and the like, are connected to the peripherals interface 206, to facilitate related functionalities.

In some implementations, the user device 104 includes a camera subsystem 220 coupled to the peripherals interface 206. In some implementations, an optical sensor 222 of the camera subsystem 220 facilitates camera functions, such as taking photographs and recording video clips. In some implementations, photographs and video clips are associated with metadata when they are taken by the camera subsystem 220. Metadata includes, for example, a date tag, a time tag, and a location tag (e.g., a geo-code tag). These tags identify, respectively, the date, time, and location of the photo or video. These tags can be used for search and categorization functionality by the user device 104 (and/or the digital assistant system as a whole), as described below.

In some implementations, the user device 104 includes one or more wired and/or wireless communication subsystems 224 provide communication functions. The communication subsystems 224 typically includes various communication ports, radio frequency receivers and transmitters, and/or optical (e.g., infrared) receivers and transmitters. In some implementations, the user device 104 includes an audio subsystem 226 coupled to one or more speakers 228 and one or more microphones 230 to facilitate voice-enabled functions, such as voice recognition, voice replication, digital recording, and telephony functions.

In some implementations, an I/O subsystem 240 is also coupled to the peripheral interface 206. In some implementations, the user device 104 includes a touch screen 246, and the I/O subsystem 240 includes a touch screen controller 242 coupled to the touch screen 246. When the user device 104 includes the touch screen 246 and the touch screen controller 242, the touch screen 246 and the touch screen controller 242 are typically configured to, for example, detect contact and movement or break thereof using any of a plurality of touch sensitivity technologies, such as capacitive, resistive, infrared, surface acoustic wave technologies, proximity sensor arrays, and the like. In some implementations, the user device 104 includes a display that does not include a touch-sensitive surface. In some implementations, the user device 104 includes a separate touch-sensitive surface. In some implementations, the user device 104 includes other input controller(s) 244. When the user device 104 includes the other input controller(s) 244, the other input controller(s) 244 are typically coupled to other input/control devices 248, such as one or more buttons, rocker switches, thumb-wheel, infrared port, USB port, and/or a pointer device such as a stylus.

The memory interface 202 is coupled to memory 250. In some implementations, memory 250 includes a non-transitory computer readable medium, such as high-speed random access memory and/or non-volatile memory (e.g., one or more magnetic disk storage devices, one or more flash memory devices, one or more optical storage devices, and/or other non-volatile solid-state memory devices).

In some implementations, memory 250 stores an operating system 252, a communications module 254, a graphical user interface module 256, a sensor processing module 258, a phone module 260, and applications 262, and a subset or superset thereof. The operating system 252 includes instructions for handling basic system services and for performing hardware dependent tasks. The communications module 254 facilitates communicating with one or more additional devices, one or more computers and/or one or more servers. The graphical user interface module 256 facilitates graphic user interface processing. The sensor processing module 258 facilitates sensor-related processing and functions (e.g., processing voice input received with the one or more microphones 228). The phone module 260 facilitates phone-related processes and functions. The application module 262 facilitates various functionalities of user applications, such as electronic-messaging, web browsing, media processing, navigation, imaging and/or other processes and functions. In some implementations, the user device 104 stores in memory 250 one or more software applications 270-1 and 270-2 each associated with at least one of the external service providers.

As described above, in some implementations, memory 250 also stores client-side digital assistant instructions (e.g., in a digital assistant client module 264) and various user data 266 (e.g., user-specific vocabulary data, preference data, and/or other data such as the user's electronic address book or contact list, to-do lists, shopping lists, etc.) to provide the client-side functionalities of the digital assistant.

In various implementations, the digital assistant client module 264 is capable of accepting voice input, text input, touch input, and/or gestural input through various user interfaces (e.g., the I/O subsystem 240) of the user device 104. The digital assistant client module 264 is also capable of providing output in audio, visual, and/or tactile forms. For example, output can be provided as voice, sound, alerts, text messages, menus, graphics, videos, animations, vibrations, and/or combinations of two or more of the above. During operation, the digital assistant client module 264 communicates with the digital assistant server (e.g., the digital assistant server 106, FIG. 1) using the communication subsystems 224.

In some implementations, the digital assistant client module 264 utilizes various sensors, subsystems and peripheral devices to gather additional information from the surrounding environment of the user device 104 to establish a context associated with a user input. In some implementations, the digital assistant client module 264 provides the context information or a subset thereof with the user input to the digital assistant server (e.g., the digital assistant server 106, FIG. 1) to help deduce the user's intent.

In some implementations, the context information that can accompany the user input includes sensor information, e.g., lighting, ambient noise, ambient temperature, images or videos of the surrounding environment, etc. In some implementations, the context information also includes the physical state of the device, e.g., device orientation, device location, device temperature, power level, speed, acceleration, motion patterns, cellular signals strength, etc. In some implementations, information related to the software state of the user device 104, e.g., running processes, installed programs, past and present network activities, background services, error logs, resources usage, etc., of the user device 104 is also provided to the digital assistant server (e.g., the digital assistant server 106, FIG. 1) as context information associated with a user input.

In some implementations, the DA client module 264 selectively provides information (e.g., at least a portion of the user data 266) stored on the user device 104 in response to requests from the digital assistant server. In some implementations, the digital assistant client module 264 also elicits additional input from the user via a natural language dialogue or other user interfaces upon request by the digital assistant server 106 (FIG. 1). The digital assistant client module 264 passes the additional input to the digital assistant server 106 to help the digital assistant server 106 in intent deduction and/or fulfillment of the user's intent expressed in the user request.

In some implementations, memory 250 may include additional instructions or fewer instructions. Furthermore, various functions of the user device 104 may be implemented in hardware and/or in firmware, including in one or more signal processing and/or application specific integrated circuits, and the user device 104, thus, need not include all modules and applications illustrated in FIG. 2.

Figure 3A:
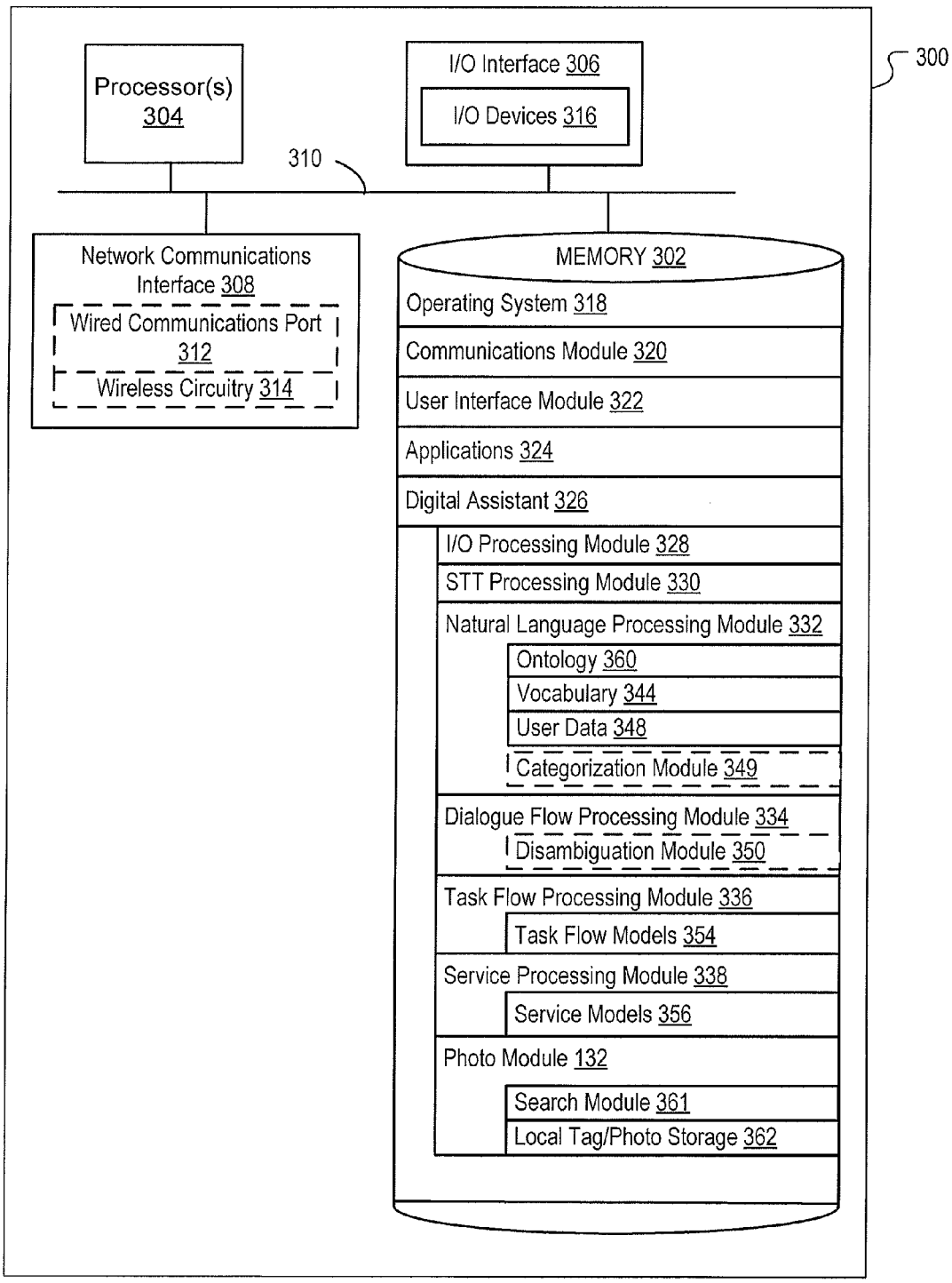
FIG. 3A is a block diagram illustrating a standalone digital assistant system or a digital assistant server system in accordance with some implementations.

FIG. 3A is a block diagram of an exemplary digital assistant system 300 (also referred to as the digital assistant) in accordance with some implementations. In some implementations, the digital assistant system 300 is implemented on a standalone computer system. In some implementations, the digital assistant system 300 is distributed across multiple computers. In some implementations, some of the modules and functions of the digital assistant are divided into a server portion and a client portion, where the client portion resides on a user device (e.g., the user device 104) and communicates with the server portion (e.g., the server system 108) through one or more networks, e.g., as shown in FIG. 1. In some implementations, the digital assistant system 300 is an embodiment of the server system 108 (and/or the digital assistant server 106) shown in FIG. 1. In some implementations, the digital assistant system 300 is implemented in a user device (e.g., the user device 104, FIG. 1), thereby eliminating the need for a client-server system. It should be noted that the digital assistant system 300 is only one example of a digital assistant system, and that the digital assistant system 300 may have more or fewer components than shown, may combine two or more components, or may have a different configuration or arrangement of the components. The various components shown in FIG. 3A may be implemented in hardware, software, firmware, including one or more signal processing and/or application specific integrated circuits, or a combination of thereof.

The digital assistant system 300 includes memory 302, one or more processors 304, an input/output (I/O) interface 306, and a network communications interface 308. These components communicate with one another over one or more communication buses or signal lines 310.

In some implementations, memory 302 includes a non-transitory computer readable medium, such as high-speed random access memory and/or a non-volatile computer readable storage medium (e.g., one or more magnetic disk storage devices, one or more flash memory devices, one or more optical storage devices, and/or other non-volatile solid-state memory devices).

The I/O interface 306 couples input/output devices 316 of the digital assistant system 300, such as displays, a keyboards, touch screens, and microphones, to the user interface module 322. The I/O interface 306, in conjunction with the user interface module 322, receives user inputs (e.g., voice input, keyboard inputs, touch inputs, etc.) and process them accordingly. In some implementations, when the digital assistant is implemented on a standalone user device, the digital assistant system 300 includes any of the components and I/O and communication interfaces described with respect to the user device 104 in FIG. 2 (e.g., one or more microphones 230). In some implementations, the digital assistant system 300 represents the server portion of a digital assistant implementation, and interacts with the user through a client-side portion residing on a user device (e.g., the user device 104 shown in FIG. 2).

In some implementations, the network communications interface 308 includes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 typically receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some implementations, the non-transitory computer readable storage medium of memory 302 stores programs, modules, instructions, and data structures including all or a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the digital assistant system 300 with other devices over the network communications interface 308. For example, the communication module 320 may communicate with the communications module 254 of the device 104 shown in FIG. 2. The communications module 320 also includes various software components for handling data received by the wireless circuitry 314 and/or wired communications port 312.

In some implementations, the user interface module 322 receives commands and/or inputs from a user via the I/O interface 306 (e.g., from a keyboard, touch screen, and/or microphone), and provides user interface objects on a display.

The applications 324 include programs and/or modules that are configured to be executed by the one or more processors 304. For example, if the digital assistant system is implemented on a standalone user device, the applications 324 may include user applications, such as games, a calendar application, a navigation application, or an email application. If the digital assistant system 300 is implemented on a server farm, the applications 324 may include resource management applications, diagnostic applications, or scheduling applications, for example.

Memory 302 also stores the digital assistant module (or the server portion of a digital assistant) 326. In some implementations, the digital assistant module 326 includes the following sub-modules, or a subset or superset thereof: an input/output processing module 328, a speech-to-text (STT) processing module 330, a natural language processing module 332, a dialogue flow processing module 334, a task flow processing module 336, a service processing module 338, and a photo module 132. Each of these processing modules has access to one or more of the following data and models of the digital assistant 326, or a subset or superset thereof: ontology 360, vocabulary index 344, user data 348, categorization module 349, disambiguation module 350, task flow models 354, service models 356, search module 361, and local tag/photo storage 362.

In some implementations, using the processing modules (e.g., the input/output processing module 328, the STT processing module 330, the natural language processing module 332, the dialogue flow processing module 334, the task flow processing module 336, and/or the service processing module 338), data, and models implemented in the digital assistant module 326, the digital assistant system 300 performs at least some of the following: identifying a user's intent expressed in a natural language input received from the user; actively eliciting and obtaining information needed to fully deduce the user's intent (e.g., by disambiguating words, names, intentions, etc.); determining the task flow for fulfilling the deduced intent; and executing the task flow to fulfill the deduced intent. In some implementations, the digital assistant also takes appropriate actions when a satisfactory response was not or could not be provided to the user for various reasons.

In some implementations, as discussed below, the digital assistant system 300 identifies, from a natural language input, a user's intent to search for photographs. The digital assistant system 300 processes the natural language input so as to determine what photographs may be relevant to the user's search query. In some implementations, the digital assistant system 300 performs other tasks related to photographs as well, such as tagging digital photographs, as described, for example, in "Voice-Based Image Tagging and Searching," U.S. application Ser. No. 13/801,534, filed Mar. 13, 2013, which is incorporated by reference herein in its entirety.

Figure 3B:
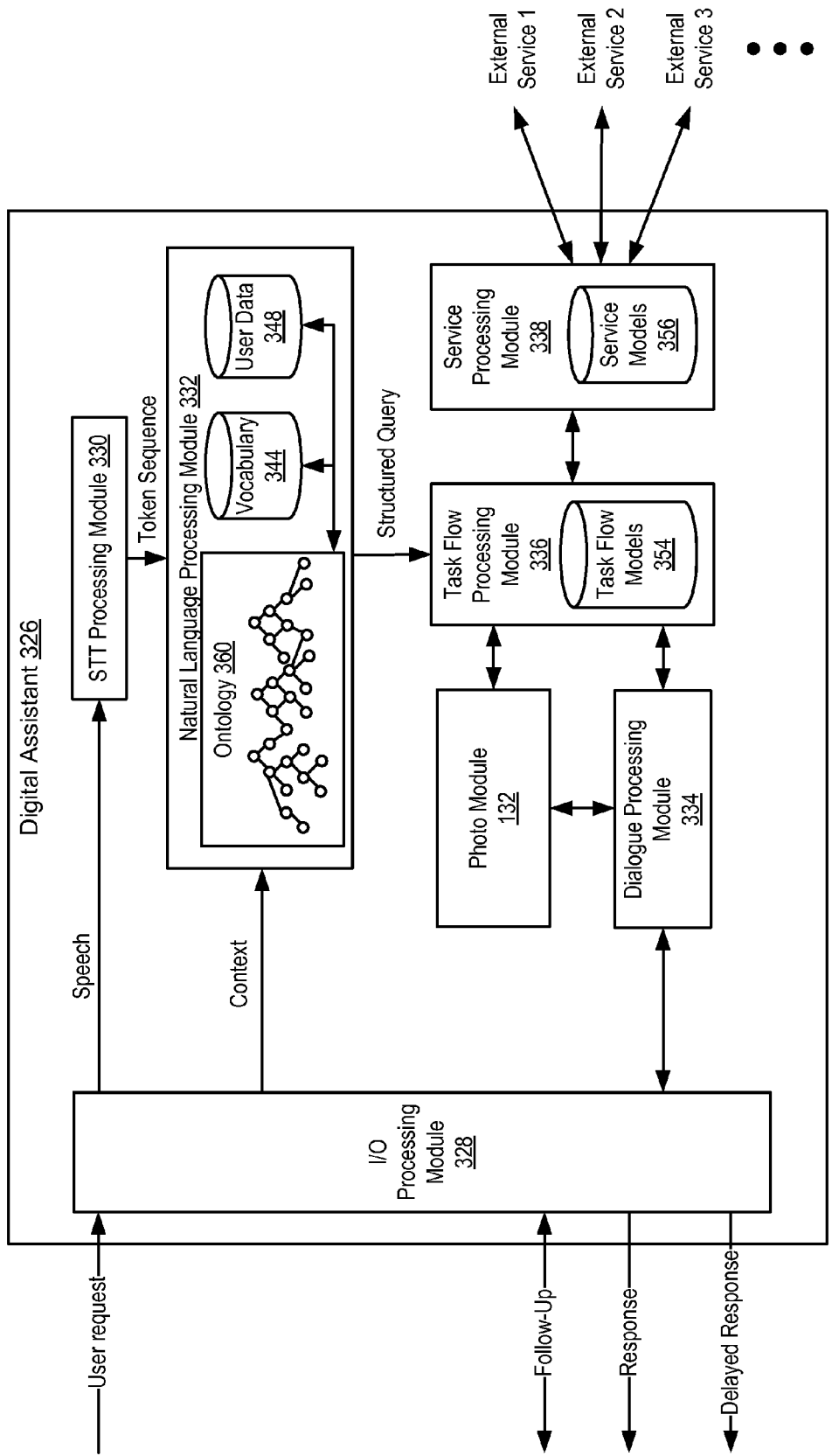
FIG. 3B is a block diagram illustrating functions of the digital assistant shown in FIG. 3A in accordance with some implementations.

As shown in FIG. 3B, in some implementations, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses to the user input. The I/O processing module 328 optionally obtains context information associated with the user input from the user device, along with or shortly after the receipt of the user input. The context information includes user-specific data, vocabulary, and/or preferences relevant to the user input. In some implementations, the context information also includes software and hardware states of the device (e.g., the user device 104 in FIG. 1) at the time the user request is received, and/or information related to the surrounding environment of the user at the time that the user request was received. In some implementations, the I/O processing module 328 also sends follow-up questions to, and receives answers from, the user regarding the user request. In some implementations, when a user request is received by the I/O processing module 328 and the user request contains a speech input, the I/O processing module 328 forwards the speech input to the speech-to-text (STT) processing module 330 for speech-to-text conversions.

In some implementations, the speech-to-text processing module 330 receives speech input (e.g., a user utterance captured in a voice recording) through the I/O processing module 328. In some implementations, the speech-to-text processing module 330 uses various acoustic and language models to recognize the speech input as a sequence of phonemes, and ultimately, a sequence of words or tokens written in one or more languages. The speech-to-text processing module 330 is implemented using any suitable speech recognition techniques, acoustic models, and language models, such as Hidden Markov Models, Dynamic Time Warping (DTW)-based speech recognition, and other statistical and/or analytical techniques. In some implementations, the speech-to-text processing can be performed at least partially by a third party service or on the user's device. Once the speech-to-text processing module 330 obtains the result of the speech-to-text processing (e.g., a sequence of words or tokens), it passes the result to the natural language processing module 332 for intent deduction.

The natural language processing module 332 ("natural language processor") of the digital assistant 326 takes the sequence of words or tokens ("token sequence") generated by the speech-to-text processing module 330, and attempts to associate the token sequence with one or more "actionable intents" recognized by the digital assistant. As used herein, an "actionable intent" represents a task that can be performed by the digital assistant 326 and/or the digital assistant system 300 (FIG. 3A), and has an associated task flow implemented in the task flow models 354. The associated task flow is a series of programmed actions and steps that the digital assistant system 300 takes in order to perform the task. The scope of a digital assistant system's capabilities is dependent on the number and variety of task flows that have been implemented and stored in the task flow models 354, or in other words, on the number and variety of "actionable intents" that the digital assistant system 300 recognizes. The effectiveness of the digital assistant system 300, however, is also dependent on the digital assistant system's ability to deduce the correct "actionable intent(s)" from the user request expressed in natural language.

In some implementations, in addition to the sequence of words or tokens obtained from the speech-to-text processing module 330, the natural language processor 332 also receives context information associated with the user request (e.g., from the I/O processing module 328). The natural language processor 332 optionally uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like.

In some implementations, the natural language processing is based on an ontology 360. The ontology 360 is a hierarchical structure containing a plurality of nodes, each node representing either an "actionable intent" or a "property" relevant to one or more of the "actionable intents" or other "properties." As noted above, an "actionable intent" represents a task that the digital assistant system 300 is capable of performing (e.g., a task that is "actionable" or can be acted on). A "property" represents a parameter associated with an actionable intent or a sub-aspect of another property. A linkage between an actionable intent node and a property node in the ontology 360 defines how a parameter represented by the property node pertains to the task represented by the actionable intent node.

In some implementations, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes. For example, the ontology 360 shown in FIG. 3C includes a "restaurant reservation" node, which is an actionable intent node. Property nodes "restaurant," "date/time" (for the reservation), and "party size" are each directly linked to the "restaurant reservation" node (i.e., the actionable intent node). In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, the ontology 360 shown in FIG. 3C also includes a "set reminder" node, which is another actionable intent node. Property nodes "date/time" (for the setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in the ontology 360.

An actionable intent node, along with its linked concept nodes, may be described as a "domain." In the present discussion, each domain is associated with a respective actionable intent, and refers to the group of nodes (and the relationships therebetween) associated with the particular actionable intent. For example, the ontology 360 shown in FIG. 3C includes an example of a restaurant reservation domain 362 and an example of a reminder domain 364 within the ontology 360. The restaurant reservation domain includes the actionable intent node "restaurant reservation," property nodes "restaurant," "date/time," and "party size," and sub-property nodes "cuisine," "price range," "phone number," and "location." The reminder domain 364 includes the actionable intent node "set reminder," and property nodes "subject" and "date/time." In some implementations, the ontology 360 is made up of many domains. Each domain may share one or more property nodes with one or more other domains. For example, the "date/time" property node may be associated with many other domains (e.g., a scheduling domain, a travel reservation domain, a movie ticket domain, etc.), in addition to the restaurant reservation domain 362 and the reminder domain 364.

Figure 3C:
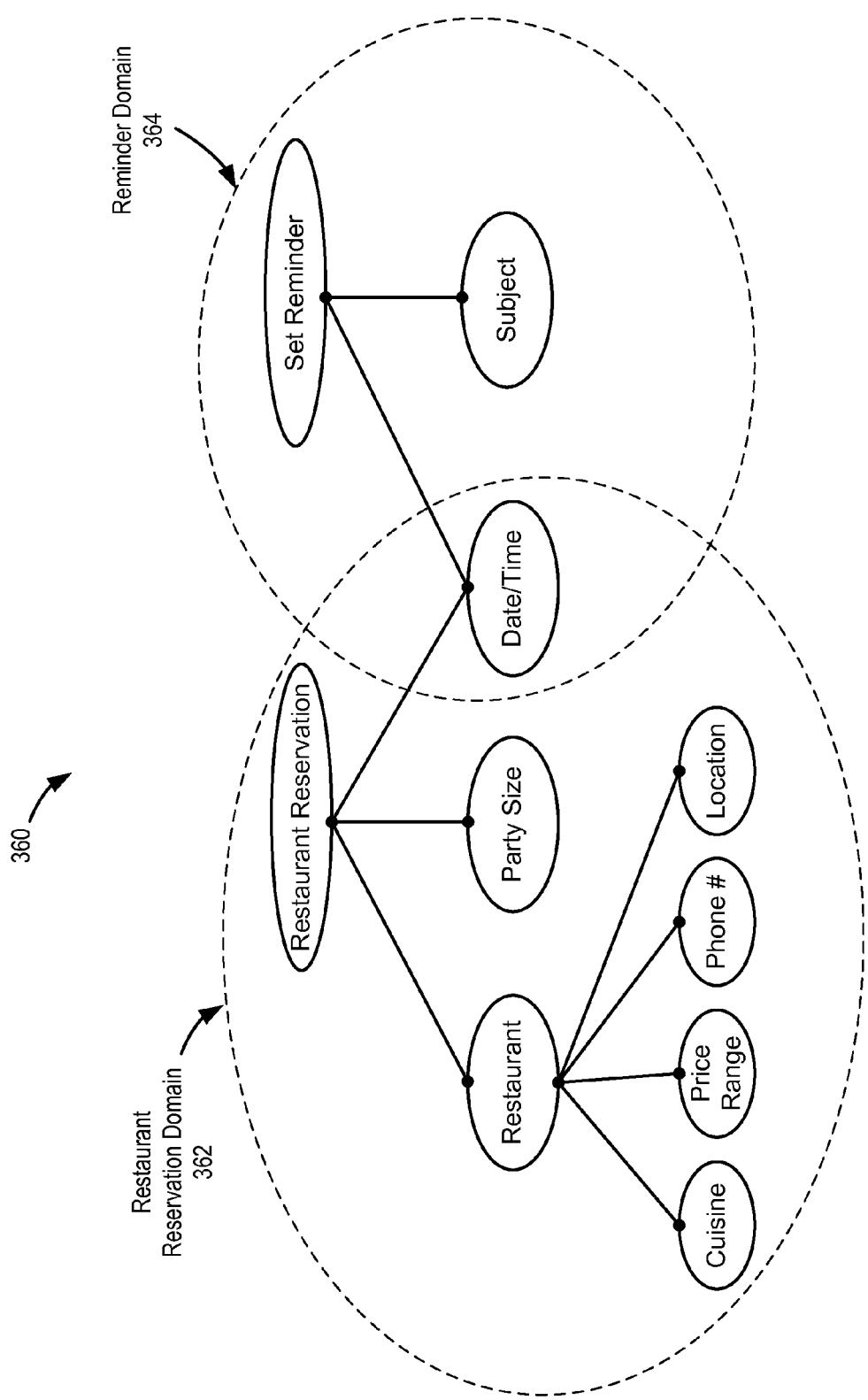
FIG. 3C is a network diagram illustrating a portion of an ontology in accordance with some implementations.

While FIG. 3C illustrates two exemplary domains within the ontology 360, the ontology 360 may include other domains (or actionable intents), such as "initiate a phone call," "find directions," "schedule a meeting," "send a message," and "provide an answer to a question," "tag a photo," and so on. For example, a "send a message" domain is associated with a "send a message" actionable intent node, and may further include property nodes such as "recipient (s)," "message type," and "message body." The property node "recipient" may be further defined, for example, by the sub-property nodes such as "recipient name" and "message address."

In some implementations, the ontology 360 includes all the domains (and hence actionable intents) that the digital assistant is capable of understanding and acting upon. In some implementations, the ontology 360 may be modified, such as by adding or removing domains or nodes, or by modifying relationships between the nodes within the ontology 360.

In some implementations, nodes associated with multiple related actionable intents may be clustered under a "super domain" in the ontology 360. For example, a "travel" super-domain may include a cluster of property nodes and actionable intent nodes related to travels. The actionable intent nodes related to travels may include "airline reservation," "hotel reservation," "car rental," "get directions," "find points of interest," and so on. The actionable intent nodes under the same super domain (e.g., the "travels" super domain) may have many property nodes in common. For example, the actionable intent nodes for "airline reservation," "hotel reservation," "car rental," "get directions," "find points of interest" may share one or more of the property nodes "start location," "destination," "departure date/time," "arrival date/time," and "party size."

In some implementations, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 (FIG. 3B) in association with the property or actionable intent represented by the node. For example, returning to FIG. 3B, the vocabulary associated with the node for the property of "restaurant" may include words such as "food," "drinks," "cuisine," "hungry," "eat," "pizza," "fast food," "meal," and so on. For another example, the vocabulary associated with the node for the actionable intent of "initiate a phone call" may include words and phrases such as "call," "phone," "dial," "ring," "call this number," "make a call to," and so on. The vocabulary index 344 optionally includes words and phrases in different languages.

In some implementations, the natural language processor 332 shown in FIG. 3B receives the token sequence (e.g., a text string) from the speech-to-text processing module 330, and determines what nodes are implicated by the words in the token sequence. In some implementations, if a word or phrase in the token sequence is found to be associated with one or more nodes in the ontology 360 (via the vocabulary index 344), the word or phrase will "trigger" or "activate" those nodes. When multiple nodes are "triggered," based on the quantity and/or relative importance of the activated nodes, the natural language processor 332 will select one of the actionable intents as the task (or task type) that the user intended the digital assistant to perform. In some implementations, the domain that has the most "triggered" nodes is selected. In some implementations, the domain having the highest confidence value (e.g., based on the relative importance of its various triggered nodes) is selected. In some implementations, the domain is selected based on a combination of the number and the importance of the triggered nodes. In some implementations, additional factors are considered in selecting the node as well, such as whether the digital assistant system 300 has previously correctly interpreted a similar request from a user.

In some implementations, the digital assistant system 300 also stores names of specific entities in the vocabulary index 344, so that when one of these names is detected in the user request, the natural language processor 332 will be able to recognize that the name refers to a specific instance of a property or sub-property in the ontology. In some implementations, the names of specific entities are names of businesses, restaurants, people, movies, and the like. In some implementations, the digital assistant system 300 can search and identify specific entity names from other data sources, such as the user's address book or contact list, a movies database, a musicians database, and/or a restaurant database. In some implementations, when the natural language processor 332 identifies that a word in the token sequence is a name of a specific entity (such as a name in the user's address book or contact list), that word is given additional significance in selecting the actionable intent within the ontology for the user request.

For example, when the words "Mr. Santo" are recognized from the user request, and the last name "Santo" is found in the vocabulary index 344 as one of the contacts in the user's contact list, then it is likely that the user request corresponds to a "send a message" or "initiate a phone call" domain. For another example, when the words "ABC Café" are found in the user request, and the term "ABC Café" is found in the vocabulary index 344 as the name of a particular restaurant in the user's city, then it is likely that the user request corresponds to a "restaurant reservation" domain.

User data 348 includes user-specific information, such as user-specific vocabulary, user preferences, user address, user's default and secondary languages, user's contact list, and other short-term or long-term information for each user. The natural language processor 332 can use the user-specific information to supplement the information contained in the user input to further define the user intent. For example, for a user request "invite my friends to my birthday party," the natural language processor 332 is able to access user data 348 to determine who the "friends" are and when and where the "birthday party" would be held, rather than requiring the user to provide such information explicitly in his/her request.

In some implementations, natural language processor 332 includes categorization module 349. In some implementations, the categorization module 349 determines whether each of the one or more terms in a text string (e.g., corresponding to a speech input associated with a digital photograph) is one of an entity, an activity, or a location, as discussed in greater detail below. In some implementations, the categorization module 349 classifies each term of the one or more terms as one of an entity, an activity, or a location.

Once the natural language processor 332 identifies an actionable intent (or domain) based on the user request, the natural language processor 332 generates a structured query to represent the identified actionable intent. In some implementations, the structured query includes parameters for one or more nodes within the domain for the actionable intent, and at least some of the parameters are populated with the specific information and requirements specified in the user request. For example, the user may say "Make me a dinner reservation at a sushi place at 7." In this case, the natural language processor 332 may be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. Based on the information contained in the user's utterance, the natural language processor 332 may generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some implementations, the natural language processor 332 populates some parameters of the structured query with received context information. For example, if the user requested a sushi restaurant "near me," the natural language processor 332 may populate a {location} parameter in the structured query with GPS coordinates from the user device 104.

In some implementations, the natural language processor 332 passes the structured query (including any completed parameters) to the task flow processing module 336 ("task flow processor"). The task flow processor 336 is configured to perform one or more of: receiving the structured query from the natural language processor 332, completing the structured query, and performing the actions required to "complete" the user's ultimate request. In some implementations, the various procedures necessary to complete these tasks are provided in task flow models 354. In some implementations, the task flow models 354 include procedures for obtaining additional information from the user, and task flows for performing actions associated with the actionable intent.

As described above, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue processing module 334 ("dialogue processor") to engage in a dialogue with the user. In some implementations, the dialogue processing module 334 determines how (and/or when) to ask the user for the additional information, and receives and processes the user responses. In some implementations, the questions are provided to and answers are received from the users through the I/O processing module 328. For example, the dialogue processing module 334 presents dialogue output to the user via audio and/or visual output, and receives input from the user via spoken or physical (e.g., touch gesture) responses. Continuing with the example above, when the task flow processor 336 invokes the dialogue processor 334 to determine the "party size" and "date" information for the structured query associated with the domain "restaurant reservation," the dialogue processor 334 generates questions such as "For how many people?" and "On which day?" to pass to the user. Once answers are received from the user, the dialogue processing module 334 populates the structured query with the missing information, or passes the information to the task flow processor 336 to complete the missing information from the structured query.

In some cases, the task flow processor 336 may receive a structured query that has one or more ambiguous properties. For example, a structured query for the "send a message" domain may indicate that the intended recipient is "Bob," and the user may have multiple contacts named "Bob." The task flow processor 336 will request that the dialogue processor 334 disambiguate this property of the structured query. In turn, the dialogue processor 334 may ask the user "Which Bob?", and display (or read) a list of contacts named "Bob" from which the user may choose.

In some implementations, dialogue processor 334 includes disambiguation module 350. In some implementations, disambiguation module 350 disambiguates one or more ambiguous terms (e.g., one or more ambiguous terms in a text string corresponding to a speech input associated with a digital photograph). In some implementations, disambiguation module 350 identifies that a first term of the one or more terms has multiple candidate meanings, prompts a user for additional information about the first term, receives the additional information from the user in response to the prompt and identifies the entity, activity, or location associated with the first term in accordance with the additional information.

In some implementations, disambiguation module 350 disambiguates pronouns. In such implementations, disambiguation module 350 identifies one of the one or more terms as a pronoun and determines a noun to which the pronoun refers. In some implementations, disambiguation module 350 determines a noun to which the pronoun refers by using a contact list associated with a user of the electronic device. Alternatively, or in addition, disambiguation module 350 determines a noun to which the pronoun refers as a name of an entity, an activity, or a location identified in a previous speech input associated with a previously tagged digital photograph. Alternatively, or in addition, disambiguation module 350 determines a noun to which the pronoun refers as a name of a person identified based on a previous speech input associated with a previously tagged digital photograph.

In some implementations, disambiguation module 350 accesses information obtained from one or more sensors (e.g., proximity sensor 214, light sensor 212, GPS receiver 213, temperature sensor 215, and motion sensor 210) of a handheld electronic device (e.g., user device 104) for determining a meaning of one or more of the terms. In some implementations, disambiguation module 350 identifies two terms each associated with one of an entity, an activity, or a location. For example, a first of the two terms refers to a person, and a second of the two terms refers to a location. In some implementations, disambiguation module 350 identifies three terms each associated with one of an entity, an activity, or a location.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "restaurant reservation" may include steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, the task flow processor 336 may perform the steps of: (1) logging onto a server of the ABC Café or a restaurant reservation system that is configured to accept reservations for multiple restaurants, such as the ABC Café, (2) entering the date, time, and party size information in a form on the website, (3) submitting the form, and (4) making a calendar entry for the reservation in the user's calendar. In another example, described in greater detail below, the task flow processor 336 executes steps and instructions associated with tagging or searching for digital photographs in response to a voice input, e.g., in conjunction with photo module 132.

In some implementations, the task flow processor 336 employs the assistance of a service processing module 338 ("service processor") to complete a task requested in the user input or to provide an informational answer requested in the user input. For example, the service processor 338 can act on behalf of the task flow processor 336 to make a phone call, set a calendar entry, invoke a map search, invoke or interact with other user applications installed on the user device, and invoke or interact with third party services (e.g. a restaurant reservation portal, a social networking website or service, a banking portal, etc.). In some implementations, the protocols and application programming interfaces (API) required by each service can be specified by a respective service model among the service models 356. The service processor 338 accesses the appropriate service model for a service and generates requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameters to the online reservation service. When requested by the task flow processor 336, the service processor 338 can establish a network connection with the online reservation service using the web address stored in the service models 356, and send the necessary parameters of the reservation (e.g., time, date, party size) to the online reservation interface in a format according to the API of the online reservation service.

In some implementations, the natural language processor 332, dialogue processor 334, and task flow processor 336 are used collectively and iteratively to deduce and define the user's intent, obtain information to further clarify and refine the user intent, and finally generate a response (e.g., provide an output to the user, or complete a task) to fulfill the user's intent.

In some implementations, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some implementations, the digital assistant also requests the user to indicate whether the user is satisfied with the response produced by the digital assistant 326.

In some implementations, the digital assistant 326 includes a photo module 132 (FIG. 3A). In some implementations, the photo module 132 acts in conjunction with the task flow processing module 336 (FIG. 3A) to search for digital photographs in response to a user input.

The photo module 132 performs operations on and searches for photographs. For example, in some implementations, the photo module 132 creates tags, retrieves tags associated with fingerprints of a digital photograph, associates tags with photographs (e.g., tagging the photograph), searches a photo database (e.g., the photo and tag database 130, FIG. 1) based on a user input to identify photographs, and locally stores photographs each in association with one or more tags.

In some implementations, the photo module 132 includes a search module 361. In some implementations, the search module 361 generates search queries used for searching digital photographs based on speech input, as explained in further detail with reference to Method 400 (FIGS. 4A-4C) below. For example, in some implementations, the photo module 132 receives a natural language text string corresponding to a photo search request, and consults an information source, such as a calendar, social network, etc. (e.g., information service 122-3, calendar service 122-4), to identify information with which to perform a search of photo metadata. As described below, the information may include date parameters, time parameters, or geo-code parameters. The search module 361 identifies, from a collection of photographs (e.g., from the photo and tag database 130, FIG. 1), one or more photographs associated with a tag that matches one of the parameters. For example, for a received voice input corresponding to the search string "find photos of my last vacation," the search module 361 consults a calendar to determine a date range of the user's last vacation, and searches among the user's photographs for any that were taken within that date range.

In some implementations, the photo module 132 includes local tag/photo storage 362. In some implementations, after the camera subsystem takes a photograph or a video, the local tag/photo storage 362 stores the photographs and tags (including, for example, metadata tags including date, time, and geo-code tags) in association with the digital photograph or video. In some implementations, the local tag/photo storage 362 stores the tags jointly with the corresponding digital photograph(s). Alternatively, or in addition, the local tag/photo storage 362 stores the tags in a remote location (e.g., on a separate memory storage device) from the corresponding photograph(s), but stores links or indexes to the corresponding photographs in association with the stored tags.

Figure 4A:
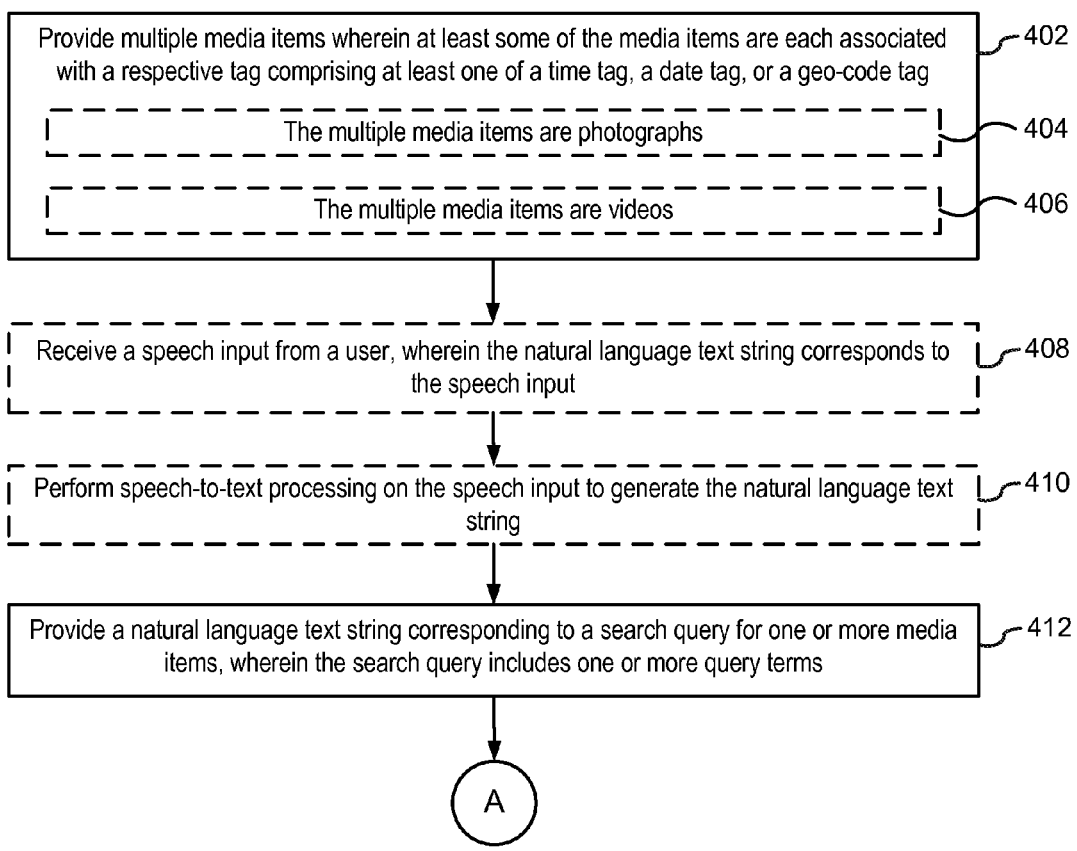
FIGS. 4A-4C are flow charts illustrating a method for searching for media items using a voice-based digital assistant, in accordance with some implementations.
Figure 4B:
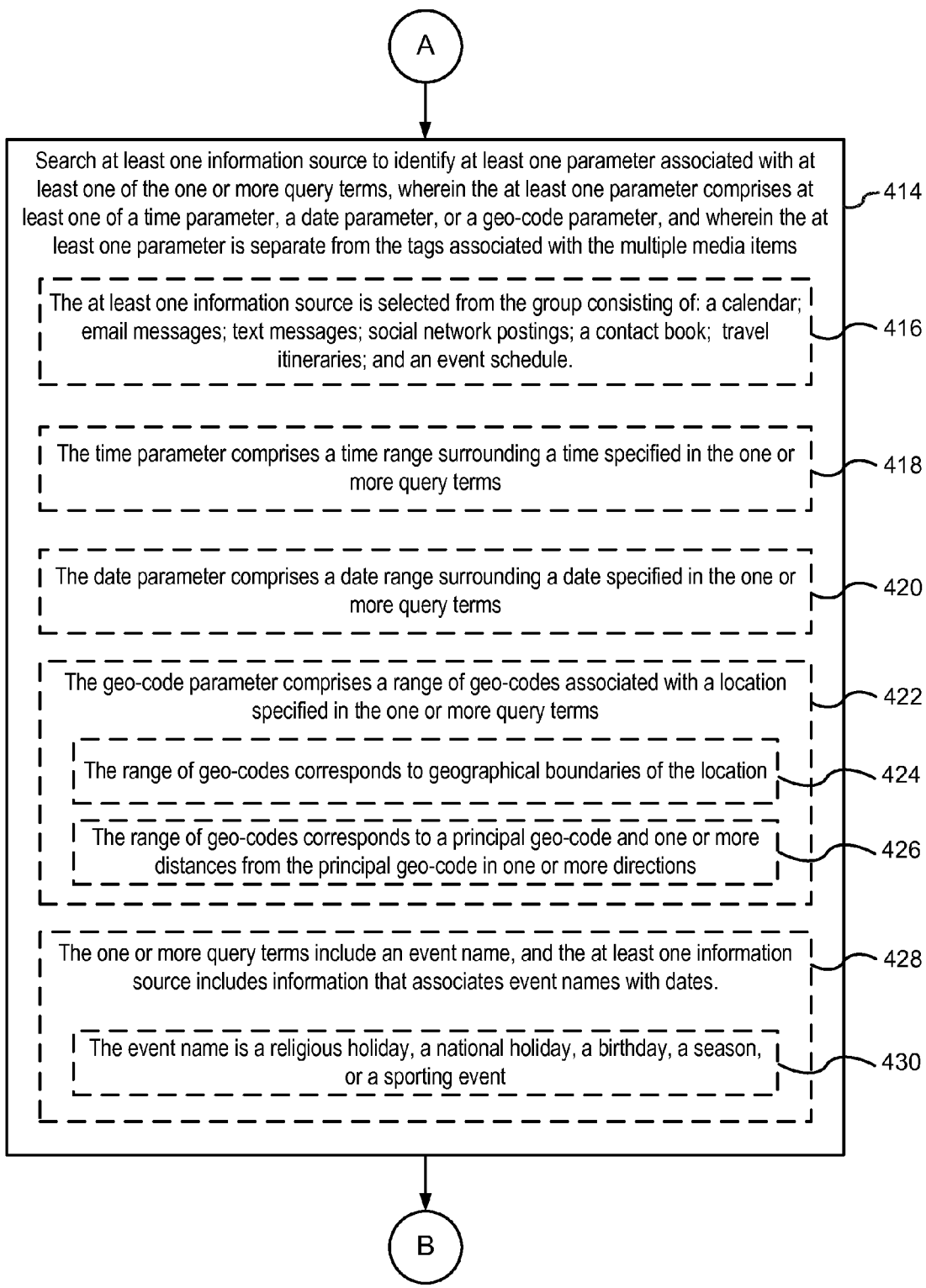
Figure 4C:
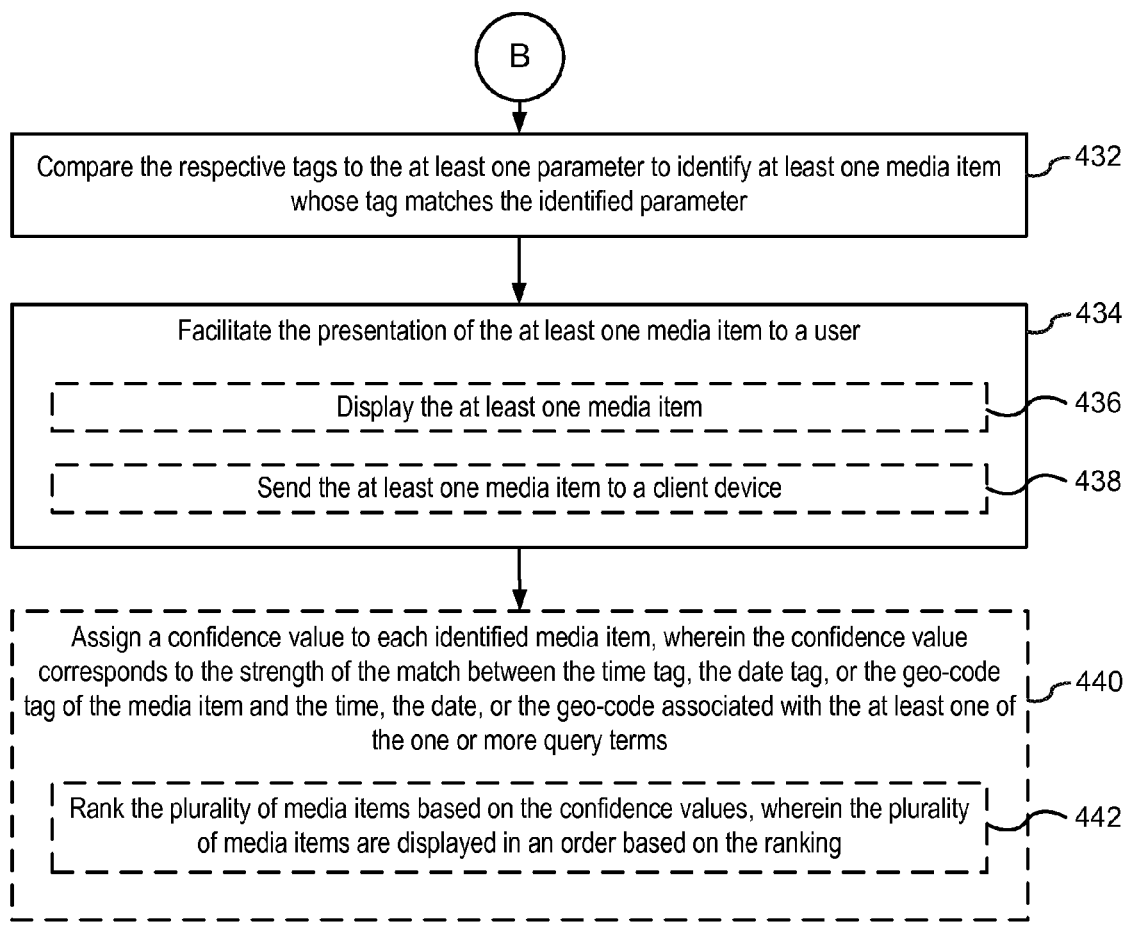

FIGS. 4A-4C are flow diagrams representing methods for searching for photographs using a voice-based digital assistant, according to certain implementations. While the present discussion refers primarily to searching for photographs, the same discussion applies equally to other media items, such as video, audio, etc. Moreover, while the following discussion describes steps, procedures, and operations as being performed by the digital assistant system 300, the steps, procedures, and operations are, in some implementations, performed by the user device 104a, the server system 108, or any other suitable device or combination of devices described above.

Photographs are typically associated with metadata tags when they are captured and/or stored by a camera, scanner, etc. For example, digital photographs often include metadata tags, including a date stamp and/or a time stamp that identifies when a photograph was taken, and a geo-code that identifies where the photograph was taken. Metadata tags are written into or otherwise associated with the digital file, e.g., the data is stored in or appears as the file's "properties." Metadata formats such as Exchangeable Image File Format (EXIF) and/or Extensible Metadata Platform (XMP) may be used. Taken alone, this information is of limited use. Specifically, a photograph taken during a user's birthday will be tagged with a date stamp of that day (e.g., 8/16/2010), but in order to search for this photograph the user must actually enter the actual date. Of course, the user could take the time to review his photographs and assign keyword tags to the photographs to make searching easier (e.g., tagging the photo with the word "birthday"), but this is cumbersome and time consuming, and many uses do not take the time to prospectively assign tags for later searching and/or categorization.

However, there are many information sources that are available to a digital assistant system that can be used to correlate calendar dates (as well as times and geo-codes) with names of events, places, people, etc. For example, a calendar associated with the user (e.g., the calendar service 122-4, or a calendar application stored on and/or provided by a user device) may contain information that links a semantic meaning—such as "birthday"—to a date—such as August 16th. By using such information sources, the digital assistant system is able to resolve natural language search queries (e.g., "show me pictures from my birthday"), into a query based on date, time, or geo-code, so that photographs can be searched based on the metadata tags that are already associated with the photographs.

Many types of information sources can be used to resolve natural language search queries into dates, times, and/or geo-codes that can be used to search for photographs. An electronic calendar, for example, may contain significant amounts of information relating to events, people, times, or locations that can be used to identify specific dates and/or times to be used for photo searching. For example, a calendar may include an entry indicating that a friend's birthday party is on a certain day and at a certain time (e.g., "Tina's Birthday Party"). If a user requests "Pictures from Tina's Party," the digital assistant will determine the date on which "Tina's Party" occurred, and search for photographs having corresponding date tags and time tags. (As discussed below, the digital assistant may expand the search range by an appropriate margin so that all relevant photographs are identified even if they fall outside the explicit time, date, or location range indicated by the information source.) As another example, a calendar may associate the names of holidays (e.g., national holidays, religious holidays, work holidays, etc.) with specific dates. Thus, a user can search for "Pics from the Labor Day Picnic," and the digital assistant, after accessing the calendar, will search for photos taken on Labor Day (e.g., 10/5/2011). In some implementations, if the calendar simply indicates the date of the Labor Day holiday, then the digital assistant searches for any photograph taken on that day (or over that weekend). In some implementations, the digital assistant uses other words in the user's natural language query to refine or modify the dates, times, or locations of the photo search. In this case, the term "picnic" may be associated with events that occur primarily after 12:00 AM, and/or that occur at a park or recreational area. Accordingly, the digital assistant may search for photographs taken in the afternoon or at likely picnic locations on Labor Day. In some implementations, if the user has a calendar entry for "Labor Day Picnic" that spans a certain time range, the search will focus on photographs taken within that specific time range (plus an appropriate margin, if necessary or desired).

In some implementations, calendars or other data services (e.g., information services 122-3) convert relative or ambiguous date/time references in a user's query to actual dates and/or times. For example, in some implementations, a calendar or service converts terms such as "yesterday," "last week," "this morning," "the other day," "the other week," and "the past week" (e.g., relative and/or ambiguous time/date references), to absolute date and/or time values or ranges. Where the query term is relative but not ambiguous, it will be converted into the absolute date/time to which it corresponds (e.g., "yesterday" and "last week" refer to specific absolute date/time ranges, but are couched in relative terms. Where the query term is ambiguous (e.g., "the other day," or "earlier today"), the calendar or service will convert the reference to a date/time range that is appropriate given the query term. For example, the term "the other day" may be converted to a date range of the previous 1, 3, 5, or days (or any other number of days). The term "the other week" may be converted to a date range of the previous 1, 3, 5, or 10 weeks (or any other number of weeks). The term "this morning" may be converted to a time range of 12:00 AM to 12:00 PM on that same day.

Also, calendar entries often contain location information that can be used by the digital assistant to facilitate photo searching. For example, a calendar entry that states "Vacation in Maui" or "Picnic at Foothills Park" provides information linking location information to dates and event information (e.g., "vacation" and "picnic"). Thus, the digital assistant can determine what dates are associated with a query that specifies only a location, such as "pics from Maui," or what geo-codes are associated with a query that specifies only an event, such as "display vacation photos." These dates or geo-codes can then be used as search parameters to identify photographs with corresponding date tags or geo-code tags.

While the above examples describe using calendars to identify dates, times, and/or geo-codes for photo searching, other information sources may have the same or similar information. For example, such information may be available from a user's social networks accounts, contact lists, digital wallet, travel itineraries, receipts, and the like. In the case of social networks, a user may post information to the social network, such as "just returned from a vacation in Maui!" Accordingly, if a user requests "vacation photos"—a query that lacks time or location information—the social network post can be used to determine what geo-codes are likely to be associated with her "vacation photos" (e.g., geo-codes associated with Maui). Also, contact lists may include information such as birthdays, anniversaries, and/or addresses. Accordingly, if a user says to a digital assistant "bring up pictures from Jim's birthday," Jim's birthdate can be identified from the contact list in order to search for photos with a corresponding date tag. In another example, if a user requests "Photos from last week's trip," the digital assistant may use travel itineraries or receipts (e.g., for planes, trains, rental cars, etc.) to determine dates, times, and/or locations of that vacation. Information sources may be available from any number of sources and/or locations. For example, in some implementations, calendars, contact lists, digital wallets, travel itineraries, and the like may be stored on a portable electronic device, such as a smartphone (e.g., user device 104a, FIG. 1). In some implementations, this information is additionally or alternatively stored by one or more remote computers or services, such as the digital assistant server 106, information service 122-3, calendar service 122-4, social networking service 122-7, etc. (FIG. 1).

Where photographs are to be searched using location information, it may be necessary to translate names of locations into geo-codes. Specifically, if photographs include automatically generated location information, it is often in the form of a geo-code, such as a latitude-longitude coordinate pair. But when location information for photo searching is identified using an information source such as a calendar, flight itinerary, social network post, etc., it is often in the form of a location name or an address. This information thus requires some translation before it may be used to search for photographs that are tagged with geographical coordinate pairs. Accordingly, in some implementations, geo-code lookup tables or databases are used to convert location information into geo-codes for searching. In some implementations, when a location is identified (e.g., "Maui, Hi."), a range of geo-codes corresponding to Maui, Hi. are identified, and the digital assistant searches for photographs that fall within the geographical area specified by those geo-codes. In some implementations, locations identified in a user's natural language search query are converted to a range of possible geo-codes, and the digital assistant identifies photos whose geo-code tags match the range of possible geo-codes. In some implementations, the digital assistant determines locations associated with the geo-code tags of the photographs to be searched (e.g., instead of or in addition to determining geo-codes of the location identified in the search query), and determines whether any of those geo-code tags correspond to the location identified in the search query. In some implementations, both of these techniques are used.

In some implementations, the digital assistant uses metadata tags of one photograph that is associated with user-generated information in order to identify time, date, or geo-code parameters to use to search for other photographs. For example, if a user posts a picture to a website of a social network, and the user (or another person in the social network) comments on, captions, or otherwise tags that photograph, it is plausible that the caption or comment describes some aspect of the photograph. Thus, the comment "From our vacation!" suggests that the photograph with which it is associated was taken during the user's vacation. Accordingly, it follows that the time, date, and/or geo-code tag of that photograph corresponds with a time, date, and/or location of the user's vacation. These tags are then used as search parameters to locate other photographs with the same or similar metadata tags. Thus, even where a comment, caption, or tag for one photograph does not itself include time, date, or location information, such information can still be determined from the time, date, or geo-code tags of that one photograph.

In general, it is preferred that a photo search return all available relevant photographs and no irrelevant photographs. However, search algorithms are often either under-inclusive (i.e., they miss some relevant results) or are over-inclusive (i.e., they include some irrelevant results along with the relevant ones). Thus, in some implementations, the digital assistant uses combinations of information sources and search parameters to identify a useful set of candidate photographs without including too many irrelevant photos or too few relevant ones. For example, a user may travel to many different locations during a vacation, such that searching for photos that took place in a specific country or city will return too few results. Accordingly, the digital assistant may perform searches based on any combination of time, date, and geo-code information in order to provide a useful and comprehensive search result.

As one example, a person may vacation in Maui for a few days, take a day trip to one of the other Hawaiian Islands, and then return to Maui for the remainder of the vacation. In some implementations, in order to respond to a search query for "pictures from my Maui trip," the digital assistant will determine that the user recently flew to Maui (e.g., using a recent travel itinerary), and identify a geo-code parameter for Maui for the photo search. In some implementations, the digital assistant will also determine that the user blocked off 7 days in her calendar as "vacation." Thus, the digital assistant can also search for photographs that took place in a different location, but are within the dates specified by the user's calendar. In some implementations, the digital assistant searches for photographs taken at a particular location, but excludes photographs that fall outside a time or date range. For example, if a user has taken several trips to a certain location, only those photographs that were taken during the previously identified "vacation" time range will be returned. Even where no specific date or time range has been identified, photographs can be inferred to relate to a particular event or type of event based on their dates and times by identifying a grouping of photographs and/or ignoring photographs with outlying dates. For example, if a user has 100 photos all taken in Hawaii during a 1 week span, and 2 additional photos from Maui taken 5 weeks away from the first grouping, it can be inferred that the 2 additional photos are not associated with the user's vacation.

In some implementations, the digital assistant searches for photographs taken during a date range (e.g., corresponding to a vacation entry in a calendar), but excludes photographs that are taken at a location that is not associated with the user. For example, a user may save photographs that were taken by someone else and that have nothing to do with their vacation, but happen to have been taken on the same day, or in the same location. In some cases, these photographs should not be identified as the user's "vacation photos." In some implementations, if the user requests "my vacation photos" or "photos from my vacation," for example, the digital assistant will recognize the term "my" and determine that the user only wishes to see their own photographs. The digital assistant then limits the results to only the user's photos (e.g., by excluding photos taken at a location not associated with the user). In some implementations, the digital assistant does not attempt to limit photographs to those that are taken by or otherwise associated with a user. For example, a user may request "photos from Paris" as a general image search. In such a case, the digital assistant may perform a general search to retrieve photos that are taken in Paris, even if they were not taken by the user.

In some implementations, searches that combine date/time and location information, as described above, get the information from any combination of sources. For example, a query may include multiple types of information, such as when a user says "get my Hawaii pics from last week." This query provides both location and temporal information. In some implementations, a query will include only one type of information, but another type of information is inferred from the query. For example, a query that says "get my Hawaii photos" can be cross-referenced with a travel itinerary showing when the user was scheduled to travel to Hawaii. The multiple types of information can then be used to provide an ideal set of search results, as the above examples describe.

In some implementations, the digital assistant engages in a dialogue with a user in order to refine and/or disambiguate a search query, to acquire additional information that may help limit search results to a more relevant set, or to increase a confidence that the digital assistant has correctly understood the query. For example, if a user searches for "photos from last summer's vacation," the digital assistant may respond to the user (e.g., via audible and/or visual output) by asking "did you mean all photos, or photos taken in a particular area?" The user can then respond with the additional information (e.g., by speaking "just Hawaii," or "all of them"). In this example, the digital assistant may have initially identified multiple groups of photos that relate to a search query for "vacation" and "summer," but were taken at different locations. Thus, the digital assistant requests the additional information from the user in order to determine which photographs the user wishes to see. The digital assistant may also or additionally identify that a search query does not contain sufficient information with which to generate a relevant result set. For example, the digital assistant may recognize that the search query for "photos from last summer's vacation" is likely to return too many results, or that those photos that are returned do not match a model or profile of "vacation" pictures (e.g., they were taken in too many different locations, they span too long a time, there are significant gaps between returned photos, etc.). Accordingly, in some implementations, the digital assistant will request additional information from the user in order to generate a search query that will return a more appropriate result set.

The photographs that are searched in response to a search query are any photographs that are associated with the user (or are publicly accessible) and accessible by the digital assistant. In some implementations, the photographs are stored on the device with which a user accesses or interfaces with a digital assistant. For example, when the user accesses a digital assistant with a smart phone, tablet computer, or camera (among other possibilities), the digital assistant may search photographs stored on that device. (Although processing the natural language input, consulting with information sources, etc., may be performed by that device or other devices, such as the digital assistant server 108, one or more external services 122-n, etc., either individually or in combination.) In some implementations, the photographs are stored remotely from the device with which the user accesses or interfaces with the digital assistant. For example, in some implementations, photographs are stored in the "cloud," i.e., at a remote server connected to the Internet. The remote server may be operated by a storage provider, a social network, a network accessible home media server or storage unit, a photo-hosting website, etc. In some implementations, the digital assistant is authorized to access (e.g., search for, view, edit, download, etc.) remotely stored images using an authorization technique. For example, in some implementations, the digital assistant is associated with credentials that allow the digital assistant to programmatically access the image sources. Specifically, the digital assistant is provided with a user's credentials to a social networking site so that the assistant can use the social network as an information source (e.g., to determine dates, times, or locations indicated by a natural language search query), or as a photograph source (e.g., to search for images that may be relevant to the natural language search query).

According to some implementations, the following methods allow a user to search for photographs on an electronic device, such as a smart phone, portable music player, laptop computer, tablet computer, etc. When a user wishes to retrieve photographs for viewing, the user may simply provide a natural language input, and the digital assistant system 300 processes the natural language input to determine what parameters to use in order to search for relevant photographs. To do so, as described above, the digital assistant system 300 uses one or more information sources to determine specific date, time, and/or geo-code search parameters that correspond to the natural language input. Then, photographs are searched to identify those that have metadata tags matching the date, time, and/or geo-code parameters of the search. Accordingly, the photographs need not be first tagged with or otherwise associated with natural language keywords in order for the natural language search feature to work.

Returning to FIGS. 4A-4C, method 400 represents a method for searching for media items using a voice-based digital assistant. Method 400 is, optionally, governed by instructions that are stored in a non-transitory computer readable storage medium and that are executed by one or more processors of one or more computer systems of a digital assistant system, including, but not limited to, the server system 108, the user device 104a, and/or the photo service 122-6. Each of the operations shown in FIGS. 4A-4C typically corresponds to instructions stored in a computer memory or non-transitory computer readable storage medium (e.g., memory 250 of client device 104, memory 302 associated with the digital assistant system 300). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various implementations, some operations in method 400 may be combined and/or the order of some operations may be changed from the order shown in FIGS. 4A-4C. Moreover, in some implementations, one or more operations in method 400 is performed by modules of the digital assistant system 300, including, for example, the natural language processing module 332, the dialogue flow processing module 334, the photo module 132, and/or any sub modules thereof.

Multiple media items are provided, wherein at least some of the media items are each associated with a respective tag comprising at least one of a time tag, a date tag, or a geo-code tag (402). In some implementations, a geo-code tag includes GPS coordinates. In some implementations, GPS coordinates comprise a latitude/longitude pair. In some implementations, the tags are metadata that is stored with the media items.

Respective ones of the multiple media items may be stored in various locations. For example, in some implementations, at least a subset of the multiple media items is stored on the electronic device. In some implementations, at least a subset of the multiple media items is stored remotely from the electronic device. In some implementations, the remotely stored media items are associated with a social networking account of a user of the electronic device. For example, a user may allow a voice-based digital assistant to access the user's social networking account so that the digital assistant can search for and retrieve media items (and/or other information) associated with the user's account. In some implementations, the digital assistant has permission to access the social networking account by virtue of a device-wide authorization.

In some implementations, the multiple media items are photographs (404). In some implementations the multiple media items are videos (406).

A natural language text string is provided, the text string corresponding to a search query for one or more media items, wherein the search query includes one or more query terms (412). In some implementations, the one or more query terms do not include any of a date, a time, or a geo-code.

In some implementations, prior to step (412), a speech input is received from a user, wherein the natural language text string corresponds to the speech input (408), and speech-to-text processing is performed on the speech input to generate the natural language text string (410). For example, a user may provide a speech input representing a query to the digital assistant, such as "show me my vacation pics." The speech input (e.g., recorded and/or cached audio) is converted to text using speech-to-text processing. The resulting text string is provided to the digital assistant. In some implementations, the speech-to-text processing (i.e., step 410) is performed by the same device on which the speech input was recorded. In some implementations, the speech-to-text processing (i.e., step 410) is performed by a different device, such as a remote speech-to-text processing server.

Method 400 continues on FIG. 4B. At least one information source is searched to identify at least one parameter associated with at least one of the one or more query terms (414). The at least one parameter comprises at least one of a time parameter, a date parameter, or a geo-code parameter, and the at least one parameter is separate from the tags associated with the multiple media items. In some implementations, the at least one information source is selected from the group consisting of: a calendar; email messages; text messages; social network postings; a contact book; travel itineraries; and an event schedule. (416). In some implementations, a calendar is a publicly accessible calendar that correlates public holidays, religious holidays, public events, and the like. In some implementations, a calendar is a private calendar associated with a user of the digital assistant. A user's private calendar may be stored, for example, on a user device (e.g., user device 104a, FIG. 1), or on an external service (e.g., calendar service 122-4 or digital assistant server 106, FIG. 1). In some implementations, a user's calendar is stored on a combination of these or other devices.

In some implementations, text messages (e.g., step 416) include messages that include a textual component, such as SMS (simple message service) messages, instant messages, and the like. In some implementations, the contents of the text messages may be accessed in order to identify possible context clues that may identify media items. Specifically, a text message sent or received by a user very near in time to a time stamp of a photograph may contain information that identifies the contents of the picture. Or, the textual content of a text message that included a media item (e.g., a photograph) as an attachment may provide clues about the contents of the media item. For example, a text message sent 2 minutes after the user took a photograph of the beach may say "We're at Polo Beach—meet us when you can." This text can be used to identify that the photograph is likely to have been taken at a Beach, and to facilitate search and retrieval of that photograph using a natural language input.

As noted above, at least one parameter associated with at least one of the one or more query terms is identified (i.e., step 414). In some implementations, a time parameter comprises a time range surrounding a time specified in the one or more query terms (418). For example, if a query includes the terms "yesterday around 2," the time parameter may comprise a time range of 12:00 to 4:00 PM of the previous day.

In some implementations, a date parameter comprises a date range surrounding a date specified in the one or more query terms (420). For example, if a query term is "Christmas," the date parameter may comprise a date range from December 23 to December 27.

In some implementations, a calendar associated with a user is searched to identify an event spanning a range of dates including and/or near the holiday. For example, a calendar may have a vacation event spanning a holiday, such as the Fourth of July. Thus, the date range of the vacation event can serve as a date parameter corresponding to a search for media items from the Fourth of July. After searching the calendar, the date tags associated with the multiple media items are searched (e.g., step (414) above) to identify at least one media item whose associated date tag falls within the range of dates.

In other examples, if a query includes a term indicating a range of a single day, the time parameter may comprise a range including 1, 2, or 3 (or more) days on either side of the indicated day. If a query includes a term indicating a range of one or more weeks, the time parameter may comprise a range including an additional 1, 2, or 3 days on either side of the specified week, or 1, 2, or 3 or more additional weeks on either side of the specified week(s). If a query includes a term indicating a range of one or more hours, the time parameter may comprise a range including ½, 1, 2, or 3 (or more) hours on either side. If a query includes a term indicating a range of one or several minutes (i.e., less than 1 hour), the time parameter may comprise a range including 5, 10, 15, or 30 (or more) minutes on either side. If a query includes a term indicating a range of one or several years, the time parameter may comprise a range including 2, 3, or 6 (or more) months on either side. Non-numerical query terms may also cause the digital assistant to expand a time parameter to include a greater range. For example, in some implementations, when a query includes a holiday (e.g., Labor Day), the time parameter may comprise the entire week or weekend on which that holiday falls. The digital assistant may also expand or adjust other parameters, such as a geo-code parameter, based on the user's query. For example, if a user specifies a city in a search query, the geo-code parameter may be expanded to include surrounding cities, a county/state/region surrounding the city, etc. If a user specifies a country, the geo-code parameter may be expanded to include surrounding countries.

In some implementations, a geo-code parameter comprises a range of geo-codes associated with a location specified in the one or more query terms (422). In some implementations, the range of geo-codes corresponds to geographical boundaries of the location (424). For example, the range of geo-codes may correspond to the geographical boundaries of a city, a state, a park, a town, an island, etc. In some implementations, the range of geo-codes corresponds to a principal geo-code and one or more distances from the principal geo-code in one or more directions (426). For example, the principal geo-code may correspond to a representative geographical location for a particular location (e.g., the center of a city, the entrance of a park, etc.), and the one or more distances from the principal geo-code may correspond to a radius around the principal geo-code (e.g., a 1, 5, 10, or 100 mile radius, or other distances).

In some implementations, the one or more query terms (e.g., from the search query, (i.e., step 412)) include an event name, and the at least one information source includes information that associates event names with dates (428). For example, in some implementations, a calendar associates event names with dates. In some implementations, the event name is a religious holiday, a national holiday, a birthday, a season, a sporting event, or the like (430).

Method 400 continues on FIG. 4C. The respective tags are compared to the at least one parameter (432). Specifically, in some implementations, the geo-code tags, time tags, and/or date tags are compared with the time geo-code parameter, time parameter, and/or the date parameter, respectively, that were identified by searching the at least one information source. For example, a natural language text string may have included the query "get my vacation photos," which resulted in identifying, from the user's calendar (or through a disambiguation dialogue with the user, described above), that the user recently vacationed in Hawaii. The geo-code tags of photographs and videos associated with the user may then be compared with a range of geo-code parameters associated with the state of Hawaii to determine which photographs are likely to fall in the category of user's "vacation photos." In some implementations, locations of photographs are determined using image recognition techniques. For example, the location of an image that lacks a geo-code tag may be identified by comparing that photo to other photos with known locations. The determined location can then be used in place of a geo-code tag to facilitate searching of that photograph. Image recognition techniques (e.g., using image fingerprints to automatically tag images with location information, for example) are described in "Voice-Based Image Tagging and Searching," U.S. application Ser. No. 13/801,534, filed Mar. 13, 2013, which is incorporated by reference in its entirety.

Method 400 continues on FIG. 4C. The respective tags are compared to the at least one parameter (432). Specifically, in some implementations, the geo-code tags, time tags, and/or date tags are compared with the time geo-code parameter, time parameter, and/or the date parameter, respectively, that were identified by searching the at least one information source. For example, a natural language text string may have included the query "get my vacation photos," which resulted in identifying, from the user's calendar (or through a disambiguation dialogue with the user, described above), that the user recently vacationed in Hawaii. The geo-code tags of photographs and videos associated with the user may then be compared with a range of geo-code parameters associated with the state of Hawaii to determine which photographs are likely to fall in the category of user's "vacation photos." In some implementations, locations of photographs are determined using image recognition techniques. For example, the location of an image that lacks a geo-code tag may be identified by comparing that photo to other photos with known locations. The determined location can then be used in place of a geo-code tag to facilitate searching of that photograph. Image recognition techniques (e.g., using image fingerprints to automatically tag images with location information, for example) are described in "Voice-Based Image Tagging and Searching," U.S. Application Ser. No. 13/801,534, filed Mar. 13, 2013, which is incorporated by reference in its entirety.

Presentation of the at least one media item to the user is facilitated (434). In some implementations, such as where the method 400 is performed at a handheld electronic device or a client computer system, facilitating presentation of the at least one media item includes displaying the at least one media item on a display device (436). In some implementations, such as where the method 400 is performed at a server system, facilitating presentation of the at least one media item comprises sending the at least one media item and/or an address or identifier of the at least one media item, to a client device for display (438).

In some implementations, a confidence value is assigned to each identified media item, wherein the confidence value corresponds to the strength of the match between the time tag, the date tag, or the geo-code tag of the media item and the time, the date, or the geo-code associated with the at least one of the one or more query terms (440). In some implementations, the strength of a match is determined by the nearness of the tag of the media item to the search parameter. For example, if a user searches for "photos from Christmas," a media item with a date tag of "12/25/11" may have a higher confidence value than one taken on December 20 of that year. Where a plurality of media items are to be presented, the plurality of media items are ranked based on the confidence values, and the plurality of media items are displayed in an order based on the ranking (442). Thus, the media items that are more likely to match, or more closely match, the user's query are displayed to the user first.

It should be understood that the particular order in which the operations in FIGS. 4A-4C have been described are merely exemplary and are not intended to indicate that the described order is the only order in which the operations could be performed.

The foregoing description, for purpose of explanation, has been described with reference to specific implementations. However, the illustrative discussions above are not intended to be exhaustive or to limit the disclosed implementations to the precise forms disclosed. Many modifications and variations are possible in view of the above teachings. The implementations were chosen and described in order to best explain the principles and practical applications of the disclosed ideas, to thereby enable others skilled in the art to best utilize them with various modifications as are suited to the particular use contemplated.

It will be understood that, although the terms "first," "second," etc. may be used herein to describe various elements, these elements should not be limited by these terms. These terms are only used to distinguish one element from another. For example, a first photograph could be termed a second photograph, and, similarly, a second photograph could be termed a first photograph, without changing the meaning of the description, so long as all occurrences of the "first photograph" are renamed consistently and all occurrences of the second photograph are renamed consistently. The first photograph and the second photograph are both photographs, but they are not the same photograph.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method for searching for media items using a voice-based digital assistant, comprising: at an electronic device with a processor and memory storing instructions for execution by the processor:
   providing multiple media items wherein at least some of the media items are each associated with a respective tag comprising at least one of a time tag, a date tag, or a geo-code tag;
   providing a natural language text string corresponding to a search query for one or more media items, wherein the search query includes one or more query terms;
   searching at least one information source to identify at least one parameter associated with at least one of the one or more query terms, wherein the at least one parameter comprises at least one of a time parameter, a date parameter, or a geo-code parameter, wherein the at least one information source comprises user-specific descriptive information, and wherein the at least one parameter is not provided in the search query;
   comparing the respective tags to the at least one parameter to identify at least one media item whose tag matches the identified parameter; and
   facilitating the presentation of the at least one media item to a user.

2. The method of claim 1, wherein the multiple media items are photographs.

3. The method of claim 1, wherein the multiple media items are videos.

4. The method of claim 1, wherein the tags are metadata that is stored with the media items.

5. The method of claim 1, wherein at least a subset of the multiple media items is stored on the electronic device.

6. The method of claim 1, wherein at least a subset of the multiple media items is stored remotely from the electronic device.

7. The method of claim 6, wherein the remotely stored media items are associated with a social networking account of a user of the electronic device.

8. The method of claim 1, further comprising receiving a speech input from a user, wherein the natural language text string corresponds to the speech input.

9. The method of claim 8, further comprising performing speech-to-text processing on the speech input to generate the natural language text string.

10. The method of claim 1, wherein the at least one information source is selected from the group consisting of:
    a calendar;
    email messages;
    text messages;
    social network postings;
    a contact book;
    travel itineraries; and
    an event schedule.

11. The method of claim 1, wherein the one or more query terms include an event name, and the at least one information source includes information that associates event names with dates.

12. The method of claim 11, wherein the event name is selected from the group consisting of: a birthday; a season; and a sporting event.

13. The method of claim 1, wherein the one or more query terms include a holiday name, the method further comprising:
    searching a calendar associated with a user to identify an event spanning a range of dates including and/or near the holiday, and
    searching the time tags associated with the multiple media items to identify at least one media item whose associated time tag falls within the range of time.

14. The method of claim 1, wherein the time parameter comprises a time range surrounding a time specified in the one or more query terms.

15. The method of claim 1, wherein the date parameter comprises a date range surrounding a date specified in the one or more query terms.

16. The method of claim 1, wherein the geo-code parameter comprises a range of geocodes associated with a location specified in the one or more query terms.

17. The method of claim 16, wherein the range of geocodes corresponds to geographical boundaries of the location.

18. The method of claim 16, wherein the range of geocodes corresponds to a principal geo-code and one or more distances from the principal geo-code in one or more directions.

19. The method of claim 1, wherein one of the at least one parameter corresponds to a location, and wherein comparing the respective tags to the at least one parameter further comprises determining whether the geo-code tags correspond to the location.

20. The method of claim 1, further comprising assigning a confidence value to each identified media item, wherein the confidence value corresponds to the strength of the match between the time tag, the date tag, or the geo-code tag of the media item and the time, the date, or the geo-code associated with the at least one of the one or more query terms.

21. The method of claim 20, wherein the at least one media item comprises a plurality of media items, the method further comprising: displaying, on a display associated with the electronic device, at least a subset of the plurality of media items.

22. The method of claim 21, further comprising, prior to the displaying, ranking the plurality of media items based on the confidence values, wherein the plurality of media items are displayed in an order based on the ranking.

23. The method of claim 1, wherein the media item is audio.

24. The method of claim 1, wherein the electronic device is a handheld electronic device.

25. The method of claim 1, wherein the electronic device is a server, and the text string is received at a second electronic device separate from the electronic device.

26. The method of claim 1, wherein the user-specific descriptive information is event information.

27. An electronic device including one or more processors, a memory, and one or more programs stored in the memory and configured to be executed by the one or more processors, the one or more programs comprising instructions for:
provide multiple media items wherein at least some of the media items are each associated with a respective tag comprising at least one of a time tag, a date tag, or a geocode tag;
providing a natural language text string corresponding to a search query for one or more media items, wherein the search query includes one or more query terms;
searching at least one information source to identify at least one parameter associated with at least one of the one or more query terms, wherein the at least one parameter comprises at least one of a time parameter, a date parameter, or a geo-code parameter, wherein the at least one information source comprises user-specific descriptive information, and wherein the at least one parameter is not provided in the search query;
comparing the respective tags to the at least one parameter to identify at least one media item whose tag matches the identified parameter; and
facilitating the presentation of the at least one media item to a user.

28. A non-transitory computer readable storage medium storing one or more programs comprising instructions, which when executed by a server system, cause the server to:
provide multiple media items wherein at least some of the media items are each associated with a respective tag comprising at least one of a time tag, a date tag, or a geocode tag;
provide a natural language text string corresponding to a search query for one or more media items, wherein the search query includes one or more query terms;
search at least one information source to identify at least one parameter associated with at least one of the one or more query terms, wherein the at least one parameter comprises at least one of a time parameter, a date parameter, or a geo-code parameter, wherein the at least one information source comprises user-specific descriptive information, and wherein the at least one parameter is not provided in the search query;
compare the respective tags to the at least one parameter to identify at least one media item whose tag matches the identified parameter; and
facilitate the presentation of the at least one media item to a user.

* * * * *

UNITED STATES PATENT AND TRADEMARK OFFICE
CERTIFICATE OF CORRECTION

PATENT NO.         : 9,547,647 B2
APPLICATION NO.    : 13/681359
DATED              : January 17, 2017
INVENTOR(S)        : Sameer Badaskar Page 1 of 1

It is certified that error appears in the above-identified patent and that said Letters Patent is hereby corrected as shown below:

In the Claims

In Column 28, Line 65, in Claim 13, delete "time tags" and insert -- date tags --, therefor.

In Column 28, Line 67, in Claim 13, delete "time tags" and insert -- date tags --, therefor.

In Column 28, Line 67, in Claim 13, delete "time." and insert -- dates. --, therefor.

In Column 29, Line 8, in Claim 16, delete "geocodes" and insert -- geo-codes --, therefor.

In Column 30, Line 7, in Claim 27, delete "geocode" and insert -- geo-code --, therefor.

In Column 30, Line 31, in Claim 28, delete "geocode" and insert -- geo-code --, therefor.

Signed and Sealed this
Fourth Day of April, 2017

Michelle K. Lee
*Director of the United States Patent and Trademark Office*